(12) United States Patent
Dettinger et al.

(10) Patent No.: US 7,440,945 B2
(45) Date of Patent: Oct. 21, 2008

(54) DYNAMIC DISCOVERY OF ABSTRACT RULE SET REQUIRED INPUTS

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 11/272,587

(22) Filed: Nov. 10, 2005

(65) Prior Publication Data

US 2007/0112745 A1    May 17, 2007

(51) Int. Cl.
*G06F 7/00* (2006.01)
*G06F 17/30* (2006.01)
*G06F 17/00* (2006.01)
*G06F 9/44* (2006.01)

(52) U.S. Cl. .............. 707/6; 707/1; 707/2; 707/104.1; 717/104

(58) Field of Classification Search .............. 707/1, 707/2, 6, 104.1; 717/104
See application file for complete search history.

(56) References Cited

U.S. PATENT DOCUMENTS

| | | | | |
|---|---|---|---|---|
| 5,265,246 A | * | 11/1993 | Li et al. | 707/4 |
| 5,446,885 A | * | 8/1995 | Moore et al. | 707/103 R |
| 5,446,890 A | * | 8/1995 | Renslo et al. | 707/104.1 |
| 5,459,859 A | * | 10/1995 | Senda | 707/10 |
| 5,499,368 A | * | 3/1996 | Tate et al. | 707/4 |
| 5,721,903 A | * | 2/1998 | Anand et al. | 707/5 |
| 6,014,656 A | * | 1/2000 | Hallmark et al. | 707/2 |
| 6,026,363 A | * | 2/2000 | Shepard | 705/3 |
| 6,076,066 A | * | 6/2000 | DiRienzo et al. | 705/4 |
| 6,222,540 B1 | * | 4/2001 | Sacerdoti | 345/581 |
| 6,272,488 B1 | * | 8/2001 | Chang et al. | 707/4 |
| 6,289,334 B1 | * | 9/2001 | Reiner et al. | 707/3 |

(Continued)

FOREIGN PATENT DOCUMENTS

JP    2002149697 A    *    5/2002

OTHER PUBLICATIONS

Dettinger, et al., U.S. Appl. No. 10/083,075, filed Feb. 26, 2002, "Application Portability and Extensibility Through Database Schema and Query Abstraction".

(Continued)

*Primary Examiner*—Pierre M. Vital
*Assistant Examiner*—Christopher P Nofal
(74) *Attorney, Agent, or Firm*—Patterson & Sheridan, LLP

(57) ABSTRACT

A method, system and article of manufacture for processing rule sets and, more particularly, for processing abstract rule sets. One embodiment provides a computer-implemented method of managing execution of an analysis routine on input data. The method comprises receiving input and receiving user-selection of an analysis routine for processing the received input. The analysis routine is defined by at least one abstract rule set having one or more abstract rules each having a conditional statement and a consequential statement. The method further comprises executing the analysis routine on the received input, comprising (i) identifying all required inputs for each abstract rule of the analysis routine, (ii) determining whether the received input includes data for all required inputs, and (iii) if the received input does not include data for one or more of the required inputs, retrieving suitable data for the one or more of the required inputs from the database.

11 Claims, 22 Drawing Sheets

U.S. PATENT DOCUMENTS

| | | | |
|---|---|---|---|
| 6,353,826 B1* | 3/2002 | Seputis | 707/5 |
| 6,370,547 B1* | 4/2002 | Eftink | 707/201 |
| 6,397,223 B1* | 5/2002 | Kori | 707/102 |
| 6,449,620 B1* | 9/2002 | Draper et al. | 707/102 |
| 6,581,038 B1* | 6/2003 | Mahran | 705/3 |
| 6,581,055 B1* | 6/2003 | Ziauddin et al. | 707/4 |
| 6,725,227 B1 | 4/2004 | Li | |
| 6,732,094 B1* | 5/2004 | Cousins et al. | 707/5 |
| 7,310,639 B2* | 12/2007 | Dettinger et al. | 707/4 |
| 7,340,475 B2* | 3/2008 | Chowdhary et al. | 707/101 |
| 2002/0161602 A1* | 10/2002 | Dougherty et al. | 705/1 |
| 2004/0243545 A1* | 12/2004 | Boone et al. | 707/2 |
| 2006/0282469 A1* | 12/2006 | Pan | 707/200 |
| 2007/0005566 A1* | 1/2007 | Bobick et al. | 707/2 |
| 2007/0112827 A1* | 5/2007 | Dettinger et al. | 707/102 |

OTHER PUBLICATIONS

Dettinger, et al., U.S. Appl. No. 11/035,710, filed Jan. 14, 2005, "Timeline Condition Support for an Abstract Database".

Dettinger, et al., U.S. Appl. No. 11/083,208, filed Mar. 17, 2005, "Sequence Support Operators for an Abstract Database".

Dettinger, et al., filed herewith, "Abstract Rule Sets".

Dettinger, et al., filed herewith, "Strict Validation of Inference Rule Based on Abstraction Environment".

* cited by examiner

SAVE | SAVE AND CLOSE | CLOSE    ← 800

DEFINE RULES | MODIFY INPUT | MANAGE RULE SET

RULE SET SUMMARY

METHOD: SCRIPT ▼   GOAL: REQUIRED ▼

CONDITION

CONSEQUENCE                                          846

☐ IF ((AGE < 40) AND (ENDOTHLIN_1 == DOWN)) THEN ← 1310

ADD A CONSEQUENCE TO THIS CONDITION (REQUIRED)... ← 1320

NEW RULE | DELETE | EDIT | COPY

DONE    ← 900

DEFINE CONDITIONS

SELECT CONDITION FIELD: ← 902    CONDITION SUMMARY ← 904

⎯ 910

📁 CONDITION FIELDS              SELECT         CONDITION
  ⊞ 📁 DEMOGRAPHIC
  ⊞ 📁 GENE EXPRESSION           NO CONSEQUENCES ARE DEFINED
  ⊞ 📁 TUMOR                     FOR THIS RULE
  ⊟ 📁 RECOMMENDATIONS ⎯ 1410         1406
      📄 5FU
      📄 PRIMARY DRUG ⎯ 1420
      📄 SECONDARY DRUG
      📄 DIAGNOSIS
  ⊞ 📁 DIAGNOSTIC
      📄 THERAPY

FIG. 15

CONDITION DETAILS
- 1510 ☑ PRIMARY DRUG — 1512
- 1522 ⦿ COMPARE — 1520
  - 1540 ⦿ 5FU
  - ○ 6-MP
  - ○ 6TG
  - ○ 53
  } 1530

[APPLY] [CANCEL]
— 1060

FIG. 16

[DONE] — 1150

900

| DEFINE CONDITIONS |

SELECT CONDITION FIELD:    CONDITION SUMMARY — 904

□ CONDITION FIELDS
  ⊞ □ DEMOGRAPHIC
  ⊞ □ GENE EXPRESSION
  ⊞ □ TUMOR
  ⊟ □ RECOMMENDATIONS
    □ 5FU
    □ PRIMARY DRUG
    □ SECONDARY DRUG
    □ DIAGNOSIS
    ⊞ □ DIAGNOSTIC
    □ THERAPY

SELECT            CONDITION
□ — 1620
                  (PRIMARY DRUG = 5FU)
[DELETE]          1610
— 1130

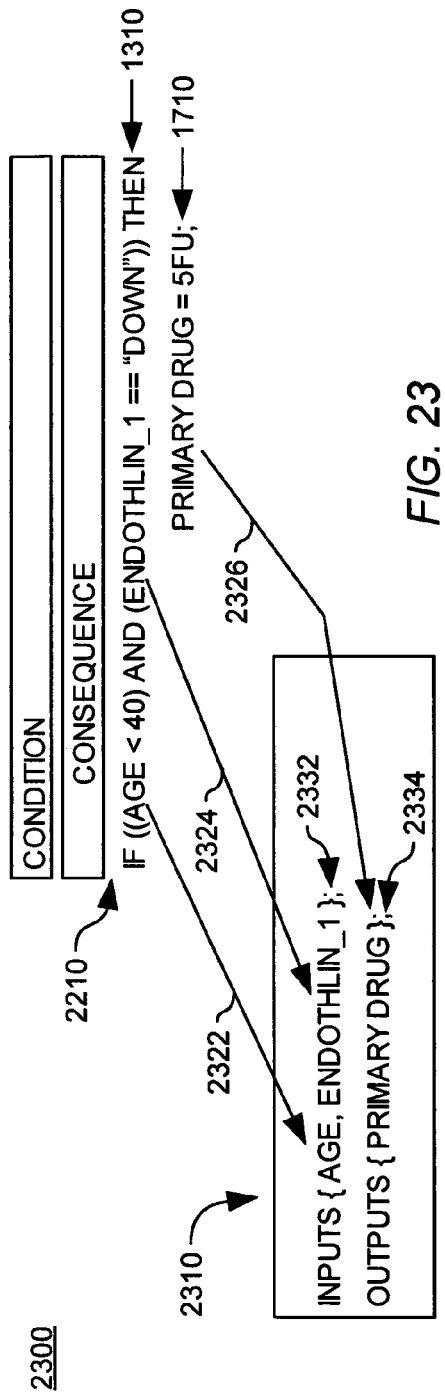
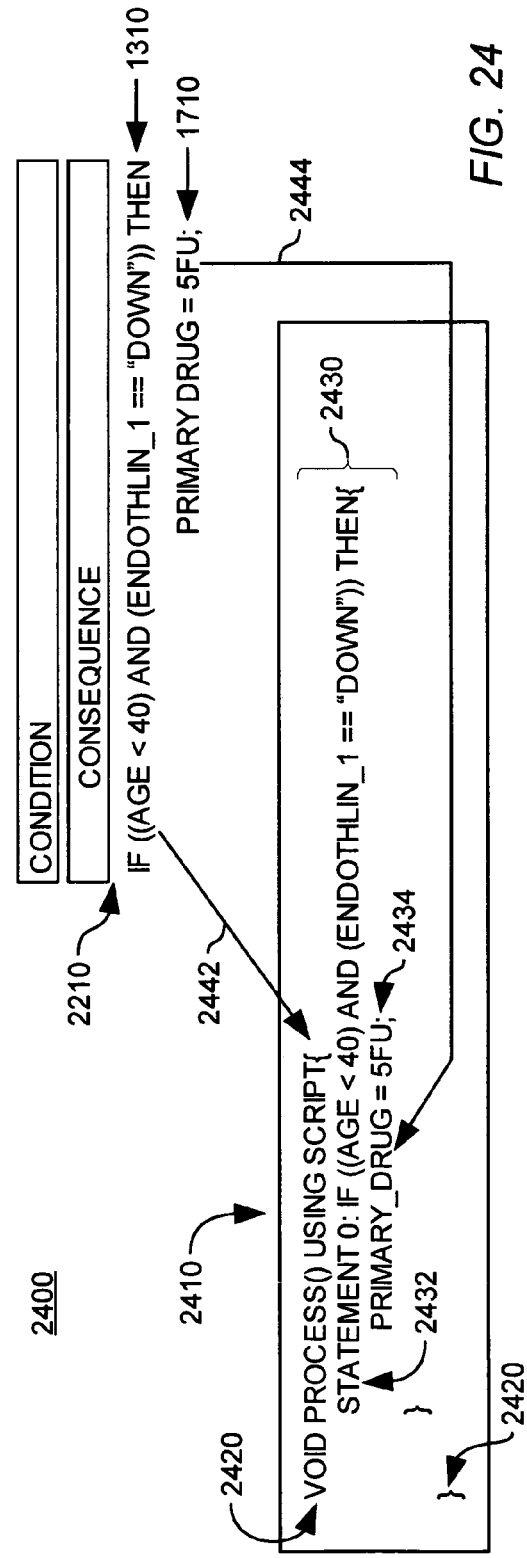

DYNAMIC DISCOVERY OF ABSTRACT RULE SET REQUIRED INPUTS

CROSS-RELATED APPLICATIONS

This application is related to the following commonly owned applications: U.S. patent application Ser. No. 10/083,075, filed Feb. 26, 2002, entitled "Application PORTABILITY AND EXTENSIBILITY THROUGH Database Schema and Query Abstraction", U.S. patent application Ser. No. 11/035,710, filed Jan. 14, 2005, entitled "TIMELINE CONDITION SUPPORT FOR AN ABSTRACT DATABASE", U.S. patent application Ser. No. 11/083,208, filed Mar. 17, 2005, entitled "SEQUENCE SUPPORT OPERATORS FOR AN ABSTRACT DATABASE", U.S. patent application Ser. No. 11/272,583, filed Nov. 10, 2005, entitled "ABSTRACT RULE SETS" and U.S. patent application Ser. No. 11/272,588, filed Nov. 10, 2005, entitled "STRICT VALIDATION OF INFERENCE RULE BASED ON ABSTRACTION ENVIRONMENT", which are hereby incorporated herein in their entirety.

BACKGROUND OF THE INVENTION

1. Field of the Invention

The present invention generally relates to rule sets and, more particularly, to abstract rule sets having one or more abstract rules.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Data that is collected and stored in a database can be used as input to analysis routines for various purposes, including know-how management, decision making and statistical analysis. For instance, in a broad variety of applications analysis routines are executed on query results obtained in response to execution of corresponding queries against an underlying database.

Analysis routines can be defined by rule sets including one or more rules, each having predicates and actions. A rule predicate is evaluated in a rules engine and if the predicate is satisfied, then the associated rule action is executed. In other words, a set of rules can be used to implement an analysis routine and a rules engine will run on the set of rules to evaluate predicates and fire or execute actions defined in the rules. Where actions of rules are defined to provide recommendations for users, such as treatment recommendations for doctors in medical institutions, the rules can be defined such that corresponding predicates reflect expert-based knowledge of possible diagnoses and evaluations of patient conditions. In other words, rules can be implemented to assist doctors by making diagnosis recommendations, drug recommendations, providing reminders of required verifications and checks, etc.

However, the creation of rules is generally a complex and difficult process which requires detailed knowledge of a corresponding database(s). More specifically, a predicate of a given rule frequently defines a condition on a column in an underlying database table. In order to create the predicate, the name or some other identifier of the column must be known to the user. In other words, for each predicate and each action of the given rule that the user wants to create, the user requires an understanding of the database schema in order to look up a corresponding column name in the underlying database table(s). Accordingly, the creation of rules is often time consuming and cumbersome.

Therefore, there is a need for an effective technique for creating rules that are suitable to implement analysis routines.

SUMMARY OF THE INVENTION

The present invention generally is directed to a method, system and article of manufacture for processing rule sets and, more particularly, for processing abstract rule sets having one or more abstract rules.

One embodiment provides a computer-implemented method of managing execution of an analysis routine on input data. The method comprises receiving input and receiving user-selection of an analysis routine for processing the received input. The analysis routine is defined by at least one abstract rule set having one or more abstract rules each having a conditional statement and a consequential statement. The consequential statement defines a particular recommendation that is returned when the conditional statement is satisfied. The conditional statement and the consequential statement are defined using logical field definitions defined in an abstraction model that models underlying physical data in a manner making a schema of the physical data transparent to a user of the abstraction model. The method further comprises executing the analysis routine on the received input, comprising (i) identifying all required inputs for each abstract rule of the analysis routine, (ii) determining whether the received input includes data for all required inputs, and (iii) if the received input does not include data for one or more of the required inputs, retrieving suitable data for the one or more of the required inputs from the database.

Another embodiment provides a computer-readable medium containing a program which, when executed by a processor, performs operations for managing execution of an analysis routine on input data. The operations comprise receiving input and receiving user-selection of an analysis routine for processing the received input. The analysis routine is defined by at least one abstract rule set having one or more abstract rules each having a conditional statement and a consequential statement. The consequential statement defines a particular recommendation that is returned when the conditional statement is satisfied. The conditional statement and the consequential statement are defined using logical field definitions defined in an abstraction model that models underlying physical data in a manner making a schema of the physical data transparent to a user of the abstraction model. The operations further comprise executing the analysis routine on the received input, comprising (i) identifying all required inputs for each abstract rule of the analysis routine, (ii) determining whether the received input includes data for all required inputs, and (iii) if the received input does not include data for one or more of the required inputs, retrieving suitable data for the one or more of the required inputs from a database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 7-18 are screen shots illustrating creation of an exemplary abstract rule set;

FIGS. 22-24 are schematic diagrams illustrating an exemplary execution of the method of FIG. 21 in one embodiment;

DETAILED DESCRIPTION OF THE PREFERRED EMBODIMENTS

Introduction

Figure 1:
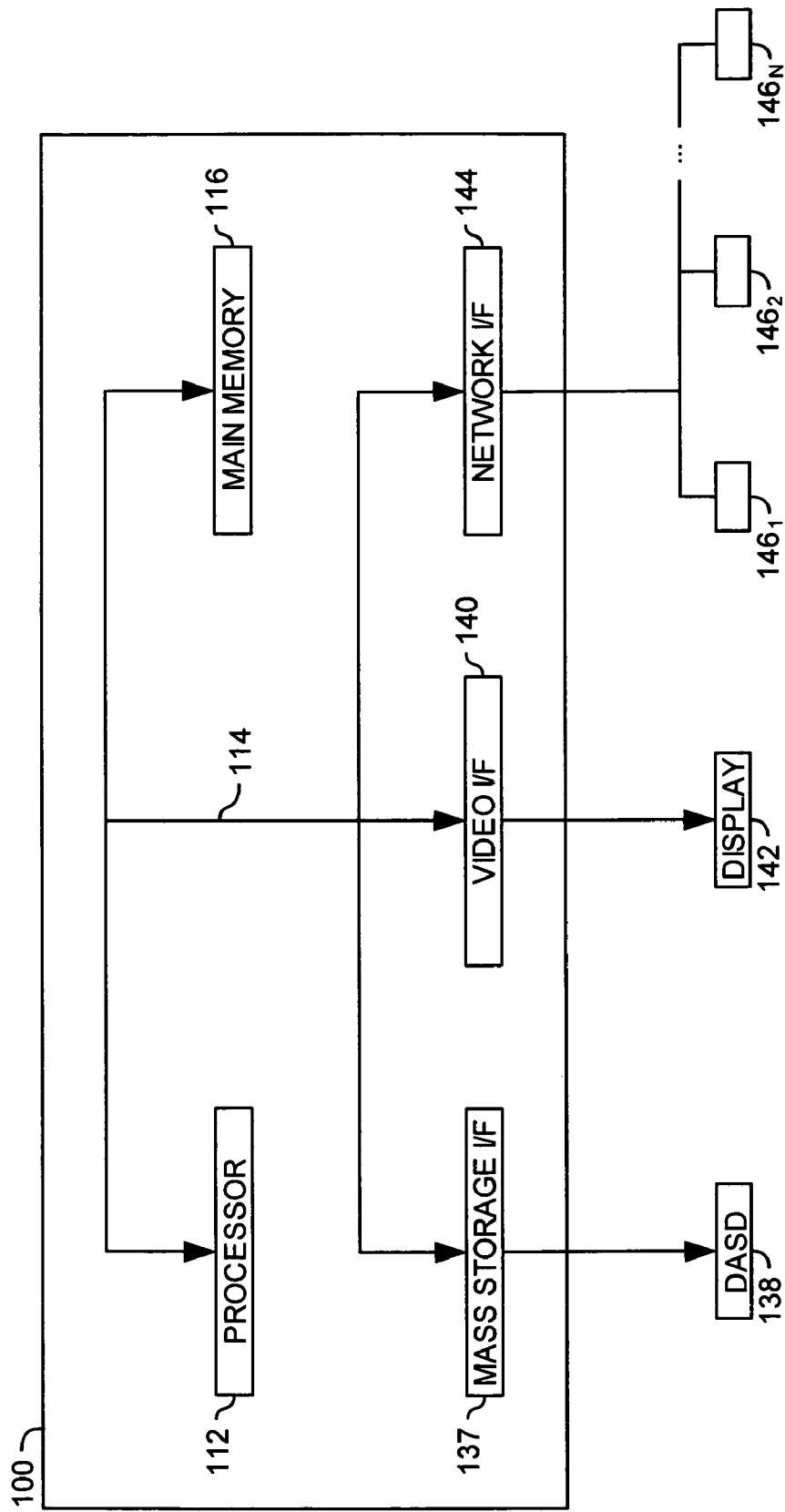
FIG. 1 is one embodiment of a computer system utilized in accordance with the invention.

The present invention is generally directed to a method, system and article of manufacture for processing rule sets and, more particularly, for processing abstract rule sets having one or more abstract rules. In the context of the invention, a rule is a set of logical statements including a conditional statement and a consequential statement. The conditional statement defines at least one requirement that must be satisfied by inputs to the rule and the consequential statement defines a predefined action that is executed by the rule when the conditional statement is satisfied. According to one aspect, an abstract rule is a rule having a conditional statement and a consequential statement that are created using logical field definitions defined in an abstraction model. The abstraction model models underlying physical data in a manner making a schema of the physical data transparent to a user of the abstraction model.

In one embodiment, a rules engine is used to generate a recommendation by executing an abstract rule having a conditional statement and a consequential statement on suitable inputs. To this end, the consequential statement of the abstract rule is configured to return a particular recommendation(s) when the conditional statement is satisfied. For execution, the abstract rule is transformed into a transformed rule that is executable on the suitable inputs by the rules engine. The transformed rule is then executed on the suitable inputs and, if the conditional statement is resolved to true for the executed transformed rule, the particular recommendation(s) is returned.

In one embodiment, the suitable inputs are determined by selecting suitable field values from a query result set which is obtained in response to execution of a query against a database. The query can be created by a user using a query creation form that is displayed to the user in response to selection of a required abstract rule for execution. Specifically, the query creation form can be configured to guide the user through selection of result fields for the query that are configured to retrieve the suitable field values.

In the following, embodiments of the invention may be described with respect to abstract queries. However, it should be noted that the invention is not limited to abstract queries and that embodiments of the invention may use any suitable queries, known or unknown, in order to generate query result sets having result data that is suitable as input(s) to abstract rules according to embodiments of the invention.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Rule Creation and Execution Environment

Figure 2:
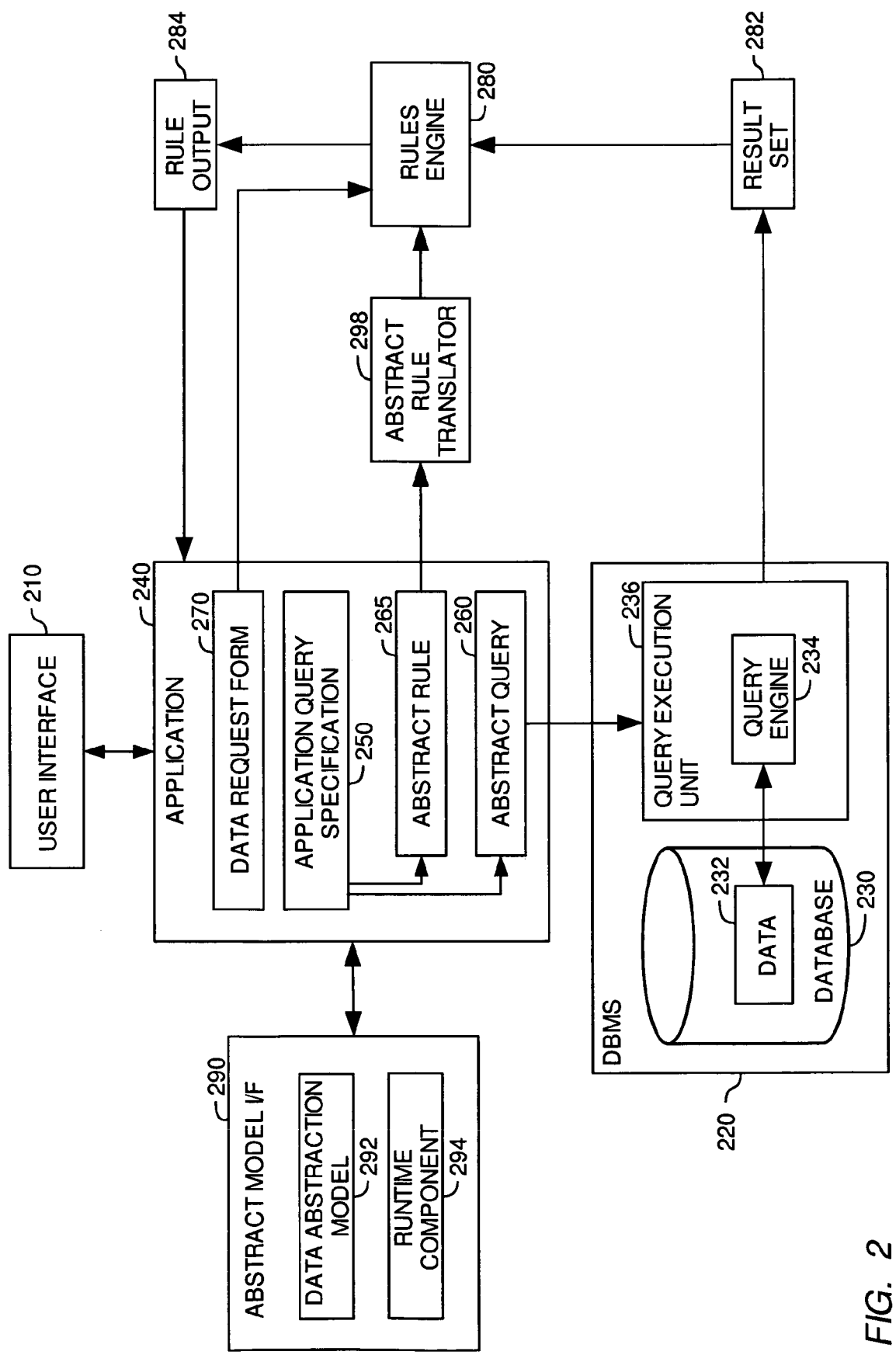
FIG. 2 is a relational view of software components of one embodiment of the invention.

Referring now to FIG. 2, a relational view of software components in one embodiment is illustrated. The software components illustratively include a user interface 210, a DBMS 220, one or more applications 240 (only one application is illustrated for simplicity), a rules engine 280, an abstract model interface 290 and an abstract rule translator 298. The abstract model interface 290 illustratively includes a data abstraction model 292 and a runtime component 294. The DBMS 220 illustratively includes a database 230 and a query execution unit 236 having a query engine 234.

The database 230 is shown as a single database having the data 232, for simplicity. However, the database 230 can also be implemented by multiple databases which can be distributed relative to one another. Moreover, one or more databases can be distributed to one or more networked devices (e.g., networked devices 146 of FIG. 1). The database 230 is representative of any collection of data regardless of the particular physical representation of the data. A physical representation of data defines an organizational schema of the data. By way of illustration, the database 230 may be organized, according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of the data 232.

According to one aspect, the application 240 (and more generally, any requesting entity including, at the highest level, users) issues queries against the data 232 in the database 230. In general, the queries issued by the application 240 are defined according to an application query specification 250 and may be predefined (i.e., hard coded as part of the application 240) or generated in response to input (e.g., user input). The application query specification(s) 250 is further described below with reference to FIGS. 3-6.

Illustratively, the queries issued by the application 240 are created by users using the user interface 210, which can be any suitable user interface configured to create/submit queries. According to one aspect, the user interface 210 is a graphical user interface. However, it should be noted that the user interface 210 is only shown by way of example; any suitable requesting entity may create and submit queries against the database 230 (e.g., the application 240, an operating system or an end user). Accordingly, all such implementations are broadly contemplated.

In one embodiment, the requesting entity accesses a suitable database connectivity tool such as a Web application, an Open DataBase Connectivity (ODBC) driver, a Java DataBase Connectivity (JDBC) driver or a Java Application Programming Interface (Java API) for creation of a query. A Web application is an application that is accessible by a Web browser and that provides some function beyond static display of information, for instance by allowing the requesting entity to query the database 230. An ODBC driver is a driver that provides a set of standard application programming interfaces to perform database functions such as connecting to the database 230, performing dynamic SQL functions, and committing or rolling back database transactions. A JDBC driver is a program included with a database management system (e.g., DBMS 220) to support JDBC standard access between the database 230 and Java applications. A Java API is a Java-based interface that allows an application program (e.g., the requesting entity, the ODBC or the JDBC) that is written in a high-level language to use specific data or functions of an operating system or another program (e.g., the application 240).

Accordingly, the queries issued by the application 240 can be in physical form, such as SQL and/or XML queries, which are consistent with the physical representation of the data 232 for execution against the database 230. Alternatively, the queries issued by the application 240 are composed using the abstract model interface 290. Such queries are referred to herein as "abstract queries". The abstract model interface 290 is further described below with reference to FIGS. 3-6. The abstract queries are transformed into a form consistent with the physical representation of the data 232 for execution against the database 230. In the illustrated example, an abstract query 260 is created on the basis of logical fields defined by the data abstraction model 292.

In one embodiment, the abstract query 260 is translated by the runtime component 294 into a concrete (i.e., executable) query. The executable query is submitted to the query execution unit 236 for execution. It should be noted that the query execution unit 236 illustratively only includes the query engine 234, for simplicity. However, the query execution unit 236 may include other components, such as a query parser and a query optimizer. A query parser is generally configured to accept a received query input from a requesting entity, such as the application(s) 240, and then parse the received query. The query parser may then forward the parsed query to the query optimizer for optimization. A query optimizer is an application program which is configured to construct a near optimal search strategy (known as an "access plan") for a given set of search parameters, according to known characteristics of an underlying database (e.g., the database 230), an underlying system on which the search strategy will be executed (e.g., computer system 110 of FIG. 1), and/or optional user specified optimization goals. But not all strategies are equal and various factors may affect the choice of an optimum search strategy. However, in general such search strategies merely determine an optimized use of available hardware/software components to execute respective queries. The query optimizer may then forward the optimized query to the query engine 234 for execution.

Illustratively, the executable query is executed by the query engine 234 against the data 232 of the database 230 to determine a result set 282 for the abstract query 260. The result set 282 includes field values which can be used as inputs to an abstract rule 265. However, it should be noted that the present invention is not limited to use of field values obtained from query results as inputs to the abstract rule 265. Instead, any suitable inputs to the abstract rule 265 are broadly contemplated including, for instance, input data provided by a user using the user interface 210.

In one embodiment, the abstract rule 265 is created by a user using a suitable user interface configured to create abstract rules, e.g., the user interface 210. By way of example, the user interface 210 can be configured to display a graphical user interface that guides the user through creation of the abstract rule 265. An exemplary graphical user interface is illustrated in FIGS. 7-18.

According to one aspect, creation of the abstract rule 265 is similar to creation of the abstract query 260. More specifically, the abstract query 260 is created by creating a results specification and, if required, selection criteria having one or more query conditions, as explained in more detail below with reference to FIGS. 3-4B. The abstract rule 265 is created by creating a conditional statement and a consequential statement, as explained in more detail below with reference to FIGS. 7-18. According to one aspect, the conditional statement and the consequential statement of the abstract rule 265 are created by performing operations which are used to create the query conditions of the abstract query 260. Accordingly, software components such as the application query specification 250 and the abstract model interface 290 that are used to create the abstract query 260 are also used to create the abstract rule 265. More specifically, the abstract rule 265 is also defined according to the application query specification 250 and may be predefined (i.e., hard coded as part of the application 240) or generated in response to input (e.g., user input). Furthermore, the abstract rule 265 is also composed using the abstract model interface 290, i.e., on the basis of the logical fields defined by the data abstraction model 292.

The abstract rule 265 is transformed into a transformed rule which is executable by the rules engine 280. More specifically, the abstract rule 265 is transformed by the abstract rule translator 298 using the data abstraction model 292. Transformation of the abstract rule 265 into the transformed rule by the abstract rule translator 298 is described in more detail below with reference to FIGS. 21-24.

In one embodiment, the transformed rule is configured for execution on the result set 282 which is obtained in response to execution of the abstract query 260. In order to guarantee that the result set 282 includes field values for all required inputs of the abstract rule 265 to enable execution of the transformed rule, the abstract query 260 can be created using a suitable data request form 270. The data request form 270 is configured to guide the user through selection of suitable result fields for the abstract query 260, for which fields corresponding field values are required as the inputs to the transformed rule. Thus, it can be guaranteed that the rules engine 280 executes the transformed rule on a valid result set.

It should be noted that the abstract rule translator 298 and the rules engine 280 are illustratively shown as separate software components. However, the functionality of the abstract rule translator 298 can also be implemented by the abstract model interface 290 or the rules engine 280. Furthermore, the functionality of the rules engine 280 can alternatively be implemented by the DBMS 220. All such implementations are broadly contemplated.

In response to execution of the transformed rule on the result set 282, the rules engine 280 outputs a rule output 284 to the application 240. By way of example, assume that all required inputs provided by the result set 282 to the transformed rule describe aspects of a medical condition of a patient of a medical institution. Assume further that the abstract rule 265 and, thus, the transformed rule is configured to provide a recommendation for treatment of the patient if the medical condition of the patient satisfies the conditional statement of the transformed rule. In other words, the recommendation is returned as the rule output 284 by the rules engine 280 if the conditional statement is satisfied. Exemplary methods illustrating operation of the rules engine are described below with reference to FIGS. 20 and 25-28.

Logical/Runtime View of Environment

Figure 3:
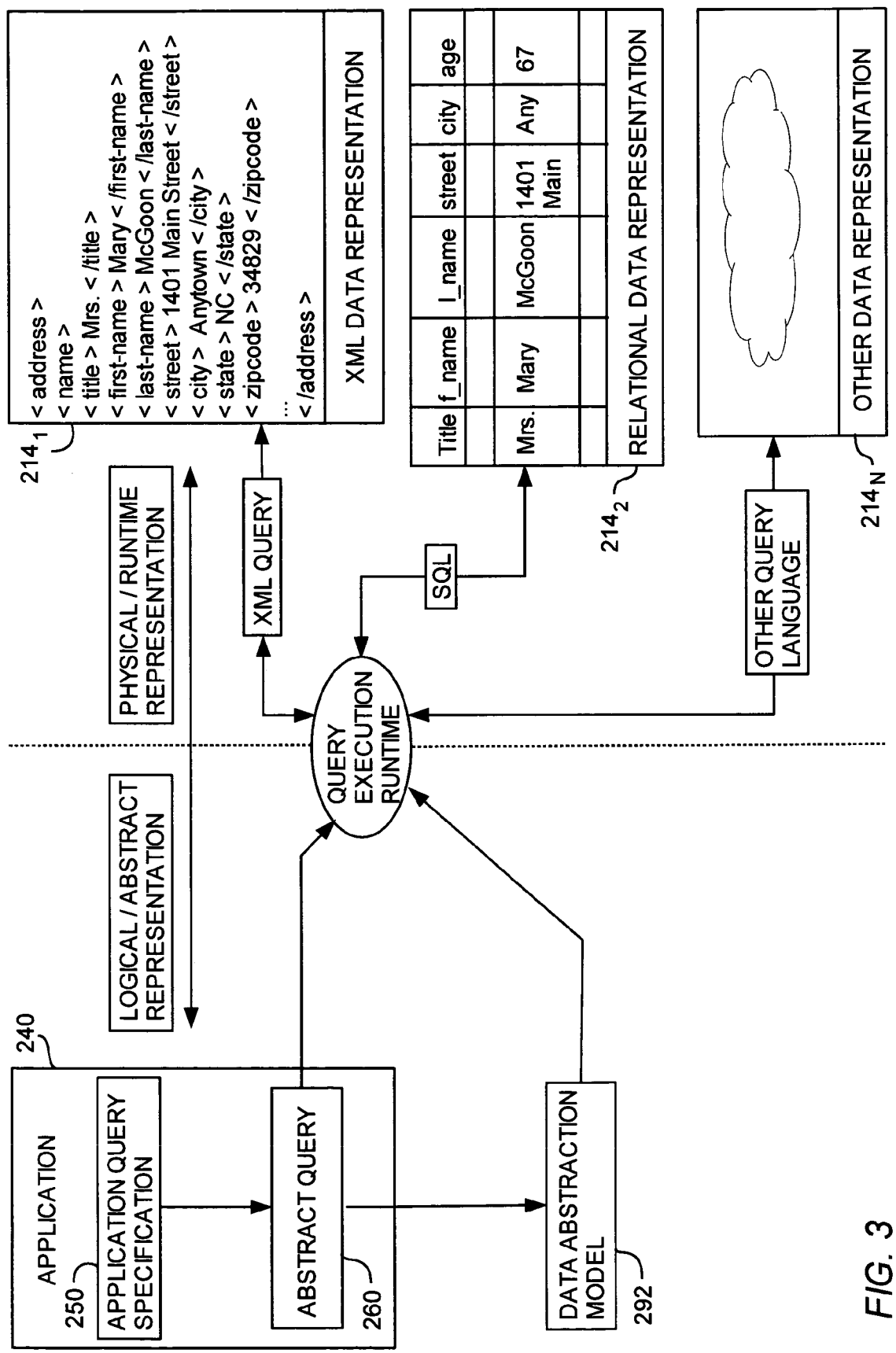
FIGS. 3-4B are relational views of software components in one embodiment.
Figure 4A:
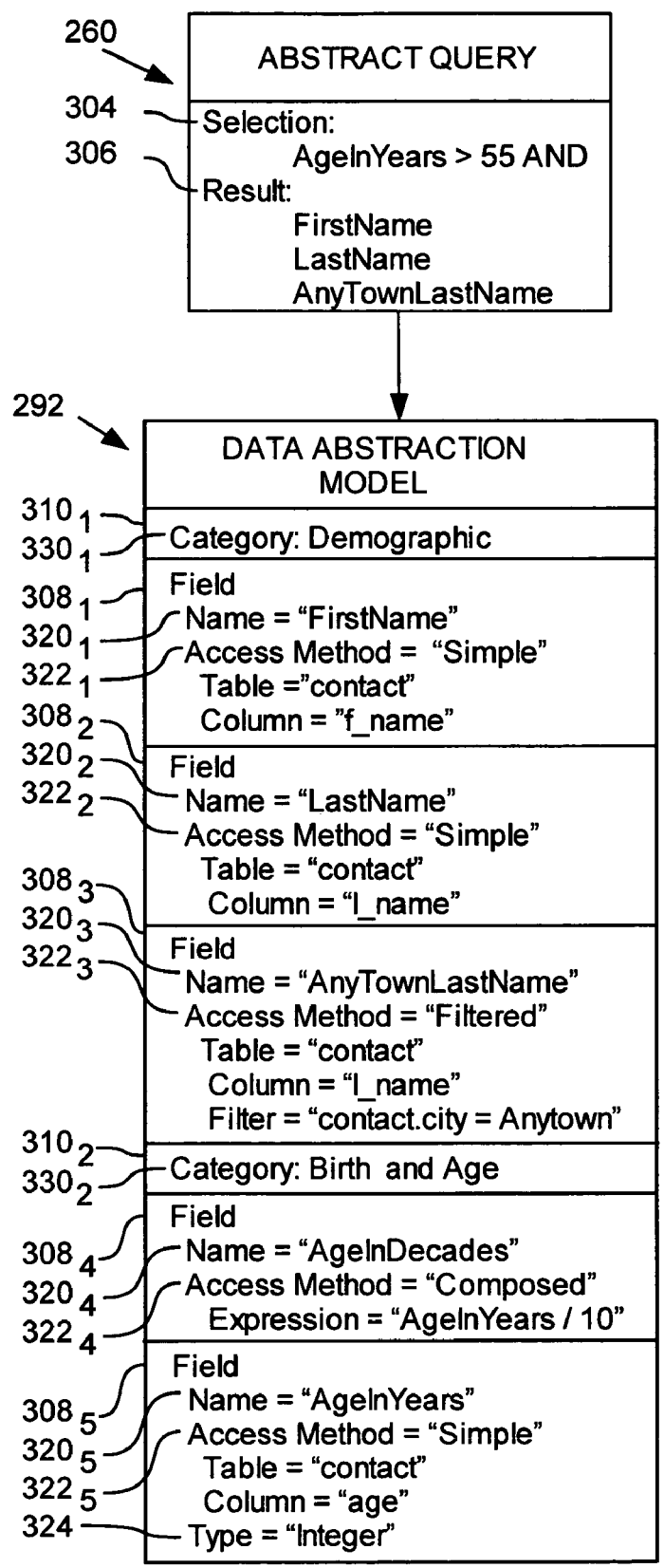
Figure 4B:
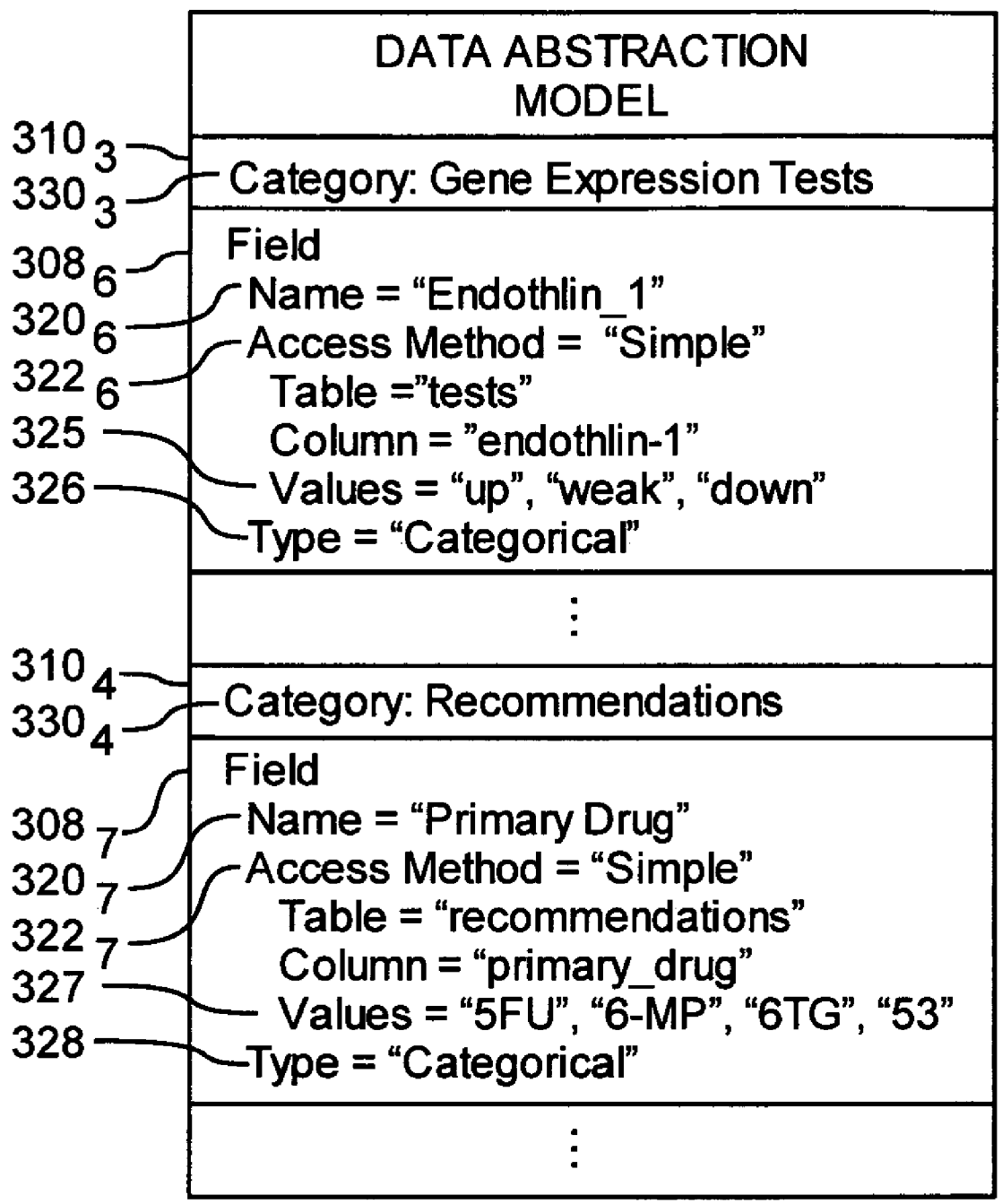

FIGS. 3-4B show an illustrative relational view of the applications 240, the application query specifications 250 and the data abstraction model 292 of FIG. 2 and other components of the invention. A requesting entity (e.g., one of the applications 240 or a user) issues the query 260 as defined by the respective application query specification 250 of the requesting entity. The resulting query 260 is generally referred to herein as an "abstract query" because the query is composed according to abstract (i.e., logical) fields rather than by direct reference to the underlying physical data entities in the database 230 of FIG. 2. As a result, abstract queries may be defined that are independent of the particular underlying data representation used. In one embodiment, the application query specification 250 may include both criteria used for data selection (selection criteria 304) and an explicit specification of the fields to be returned (return data specification 306) based on the selection criteria 304, as illustrated in FIG. 4A-B.

As was noted above, the logical fields specified by the application query specification 250 and used to compose the abstract query 260 are defined by the data abstraction model 292. In general, the data abstraction model 292 exposes information as a set of logical fields that may be used within a query (e.g., the abstract query 260) issued by the application 240 to specify criteria for data selection and specify the form of result data returned from a query operation. Furthermore, the logical fields may be used within a rule (e.g., abstract rule 265 of FIG. 2) to specify a conditional and a consequential statement. The logical fields are defined independently of the underlying data representation being used in a corresponding database (e.g., database 230 of FIG. 2), thereby allowing queries to be formed that are loosely coupled to the underlying data representation.

In one embodiment, illustrated in FIG. 4A-B, the data abstraction model 292 comprises a plurality of field specifications $308_1$, $308_2$, $308_3$, $308_4$, $308_5$, $308_6$ and $308_7$ (seven shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$, $320_6$, $320_7$ (collectively, field name 320) and an associated access method attribute $322_1$, $322_2$, $322_3$, $322_4$, $322_5$, $322_6$, $322_7$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

It should be noted that various other attributes are contemplated for the field specifications 308. For instance, each field specification may include particular metadata, such as timeline metadata. Providing field specifications with timeline data allows for creation of measurement fields in abstract queries, such as the abstract query 260. A measurement field is a result field that corresponds to a logical field of an underlying data abstraction model and that can be associated in an abstract query with a chronological condition that specifies a requested point in time for which values for the result field should be retrieved from an underlying database. More generally, timeline metadata can be used to order data elements for a logical field according to a chronological sequence. By way of example, commonly owned U.S. patent application Ser. No. 11/083,208, filed Mar. 17, 2005, entitled "SEQUENCE SUPPORT OPERATORS FOR AN ABSTRACT DATABASE", which is incorporated herein by reference in its entirety, describes timeline metadata which includes type metadata and time-ordering metadata. The timeline type metadata indicates that data retrieved for a given logical field may be ordered into a sequence of discrete events based on the order in which the events occurred, or when the data came into being. The time-ordering metadata specifies where to locate the data used to order data elements for the given logical field into a sequence. Other examples of timeline metadata are described in commonly owned U.S. patent application Ser. No. 11/035,710, filed Jan. 14, 2005 entitled, "TIMELINE CONDITION SUPPORT FOR AN ABSTRACT DATABASE", which is also incorporated herein by reference in its entirety.

In one embodiment, groups (i.e. two or more) of logical fields may be part of categories. Accordingly, the data abstraction model 292 includes a plurality of category specifications $310_1$, $310_2$, $310_3$ and $310_4$ (four shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. Furthermore, logical field $308_6$ is part of the category specification $310_3$ and logical field $308_7$ is part of the category specification $310_4$. A category specification is also referred to herein simply as a "category". The categories are distinguished according to a category name, e.g., category names $330_1$, $330_2$, $330_3$ and $330_4$ (collectively, category name(s) 330). In the present illustration, the logical fields $308_{1-3}$ are part of the "Demographic" category, logical fields $308_{4-5}$ are part of the "Birth and Age" category, the logical field $308_6$ is part of the "Gene Expression" category and the logical field $308_7$ is part of the "Recommendations" category.

The access methods 322 generally associate (i.e., map) the logical field names to data in the database (e.g., database 230 of FIG. 2). As illustrated in FIG. 3, the access methods associate the logical field names to a particular physical data representation $214_1$, $214_2$, ... $214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 292 contains field specifications (with associated access methods) for two or more physical data representations 214. In an alternative embodiment, a different single data abstraction model 292 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$, $308_5$, $308_6$ and $308_7$ exemplify simple field access methods $322_1$, $322_2$, $322_5$, $322_6$ and $322_7$, respectively. Simple fields are mapped directly to a particular entity in the underlying physical representation (e.g., a field mapped to a given database table and column). By way of illustration, as described above, the simple field access method $322_1$ shown in FIG. 4A maps the logical field name $320_1$ ("FirstName") to a column named "f_name" in a table named "contact". In one embodiment, a simple field access method may include an enumeration of possible values for the mapped particular entity in the underlying physical representation. By way of example, the simple field access method $322_6$ shown in FIG. 4B includes an enumeration 325 that defines as possible values for a column named "endothlin-1" in a table named "tests" the values "up", "weak", and "down". The simple field access method $322_7$ shown in FIG. 4B includes an enumeration 327 that defines as possible values for a column named "primary_drug" in a table named "recommendations" the values "5FU", "6-MP", "6TG" and "53". The field specification $308_3$ in FIG. 4A exemplifies a filtered field access method $322_3$. Filtered fields identify an associated physical entity and provide filters used to define a particular subset of items within the physical representation. An example is provided in FIG. 4A in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 4A the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. By way of example, field specification $308_5$ in FIG. 4A has a type attribute 324 having a value "Integer" that indicates that the underlying data of the logical field "AgeInYears" is defined as integer values. The field specifications $308_6$ and $308_7$ in FIG. 4B have type attributes 326, 328, both having a value "Categorical" that indicates that the underlying data of the logical fields "Endothlin_1" and "Primary Drug" is defined using categorical values. However, in another embodiment, the data format of the field specifications 308 is different from the associated underlying physical data, in which case a conversion of the underlying physical data into the format of the logical field is required.

By way of example, the field specifications 308 of the data abstraction model 292 shown in FIGS. 4A-B are representative of logical fields mapped to data represented in the relational data representation $214_2$ shown in FIG. 3. However, other instances of the data abstraction model 292 map logical fields to other physical representations, such as XML.

An illustrative abstract query corresponding to the abstract query 260 shown in FIG. 4A is shown in Table I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (AgeInYears > "55"--> |
| 003 | <QueryAbstraction> |
| 004 |    <Selection> |
| 005 |       <Condition internalID="4"> |
| 006 |          <Condition field="AgeInYears"operator="GT" value="55" |
| 007 |             internalID="1"/> |
| 008 |    </Selection> |
| 009 |    <Results> |
| 010 |       <Field name="FirstName"/> |
| 011 |       <Field name="LastName"/> |
| 012 |       <Field name="AnyTownLastName"/> |
| 013 |    </Results> |
| 014 | </QueryAbstraction> |

Illustratively, the abstract query shown in Table I includes a selection specicication (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, the results specification is a list of abstract fields that are to be returned as a result of query execution. A results specification in the abstract query may consist of a field name and sort criteria.

An illustrative data abstraction model (DAM) corresponding to the data abstraction model 292 shown in FIGS. 4A-B is shown in Table II below. By way of illustration, the illustrative Data Abstraction Model is defined using XML. However, any other language may be used to advantage.

TABLE II

DATA ABSTRACTION MODEL EXAMPLE

| | |
|---|---|
| 001 | <?xml version="1.0"?> |
| 002 | <DataAbstraction> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name"tableName="contact"></Simple> |
| 007 |       </AccessMethod> |
| 008 |     </Field> |
| 009 |     <Field queryable="Yes" name="LastName" displayable="Yes"> |
| 010 |       <AccessMethod> |
| 011 |         <Simple columnName="l_name"tableName="contact"></Simple> |
| 012 |       </AccessMethod> |
| 013 |     </Field> |

TABLE II-continued

DATA ABSTRACTION MODEL EXAMPLE

```
014        <Field queryable="Yes" name="AnyTownLastName"
               displayable="Yes">
015            <AccessMethod>
016                <Filter columnName="l_name"tableName=
                       "contact"
017                    "contact.city=Anytown"> </Filter>
018            </AccessMethod>
019        </Field>
020    </Category>
021    <Category name="Birth and Age">
022        <Field queryable="Yes" name="AgeInDecades"
               displayable="Yes">
023            <AccessMethod>
024                <Composed columnName="age" tableName=
                       "contact"
025                    Expression="columnName/10">
                   </Composed>
026            </AccessMethod>
027        </Field>
028        <Field queryable="Yes" name="AgeInYears" type=
               "Integer"
029                displayable="Yes">
030            <AccessMethod>
031                <Simple columnName="age"tableName=
                       "contact"></Simple>
032            </AccessMethod>
033        </Field>
034    </Category>
035    <Category name="Gene Expression">
036        <Field queryable="Yes" name="Endothlin_1"type=
               "Categorical"
037                displayable="Yes">
038            <AccessMethod>
039                <Simple columnName="endothlin-1"
                       tableName="tests">
040                    Values="up","weak","down"> </Simple>
041            </AccessMethod>
042        </Field>
043    </Category>
044    <Category name="Recommendations">
045        <Field queryable="Yes" name="Primary Drug"type=
               "Categorical"
046                displayable="Yes">
047            <AccessMethod>
048                <Simple columnName="primary_drug"
049                    tableName="recommendations">
050                    Values="5FU","6-MP","6TG","53">
                   </Simple>
051            </AccessMethod>
052        </Field>
053    </Category>
054 </DataAbstraction>
```

By way of example, note that lines 004-008 correspond to the first field specification $308_1$ of the DAM 292 shown in FIG. 4 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 5-6.

Transforming an Abstract Query Into a Concrete Query

Figure 5:
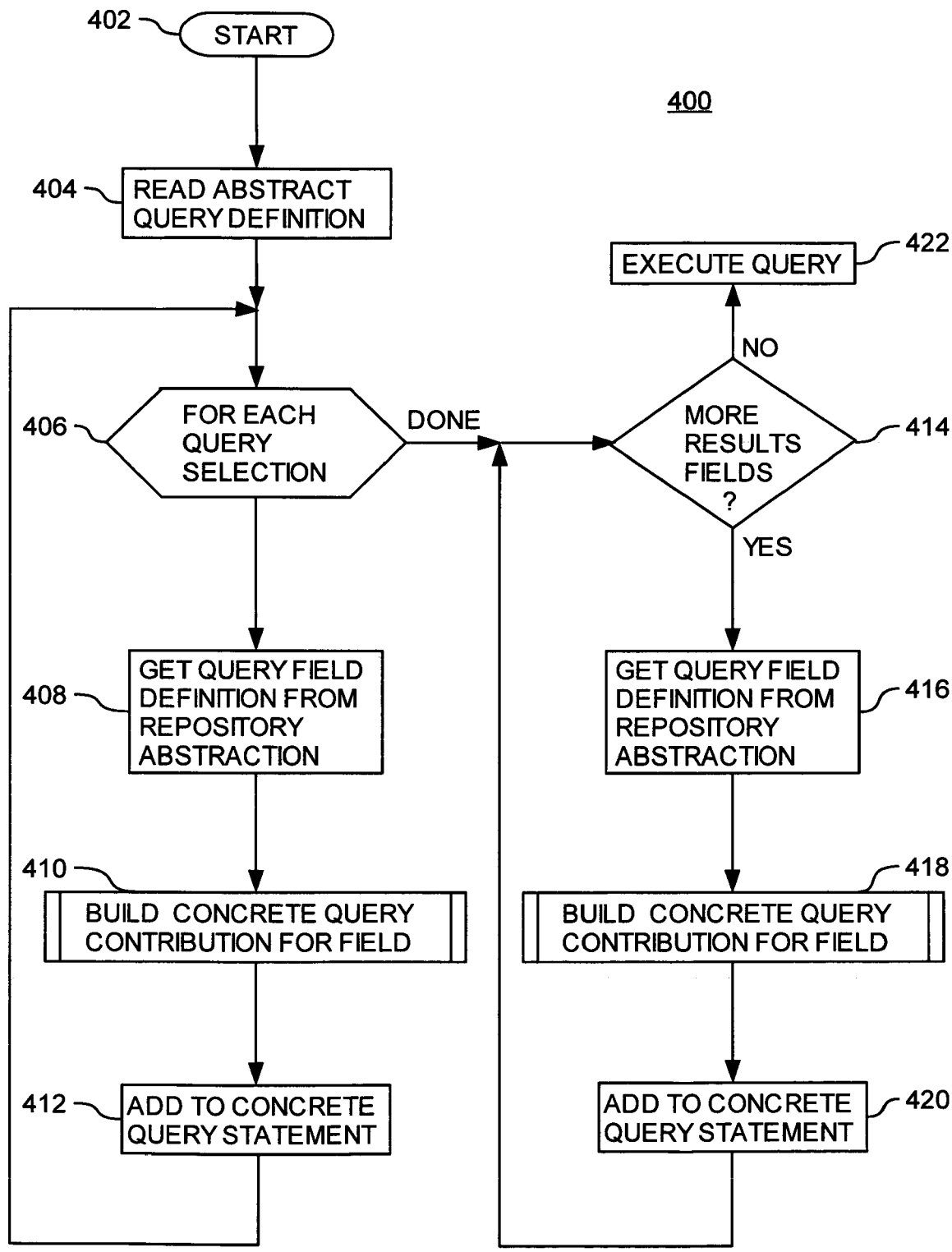
FIGS. 5-6 are flow charts illustrating the operation of a runtime component, according to one embodiment of the invention.

Referring now to FIG. 5, an illustrative runtime method 400 exemplifying one embodiment of the operation of the runtime component 294 of FIG. 2 is shown. The method 400 is entered at step 402 when the runtime component 294 receives as input an abstract query (such as the abstract query shown in Table I). At step 404, the runtime component 294 reads and parses the abstract query and locates individual selection criteria and desired result fields. At step 406, the runtime component 294 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 294 uses the field name from a selection criterion of the abstract query to look up the definition of the field in the data abstraction model 292. As noted above, the field definition includes a definition of the access method used to access the data structure associated with the field. The runtime component 294 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 230 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 294 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 294 looks up a result field name (from the result specification of the abstract query) in the data abstraction model 292 and then retrieves a result field definition from the data abstraction model 292 to identify the physical location of data to be returned for the current logical result field. The runtime component 294 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 6:
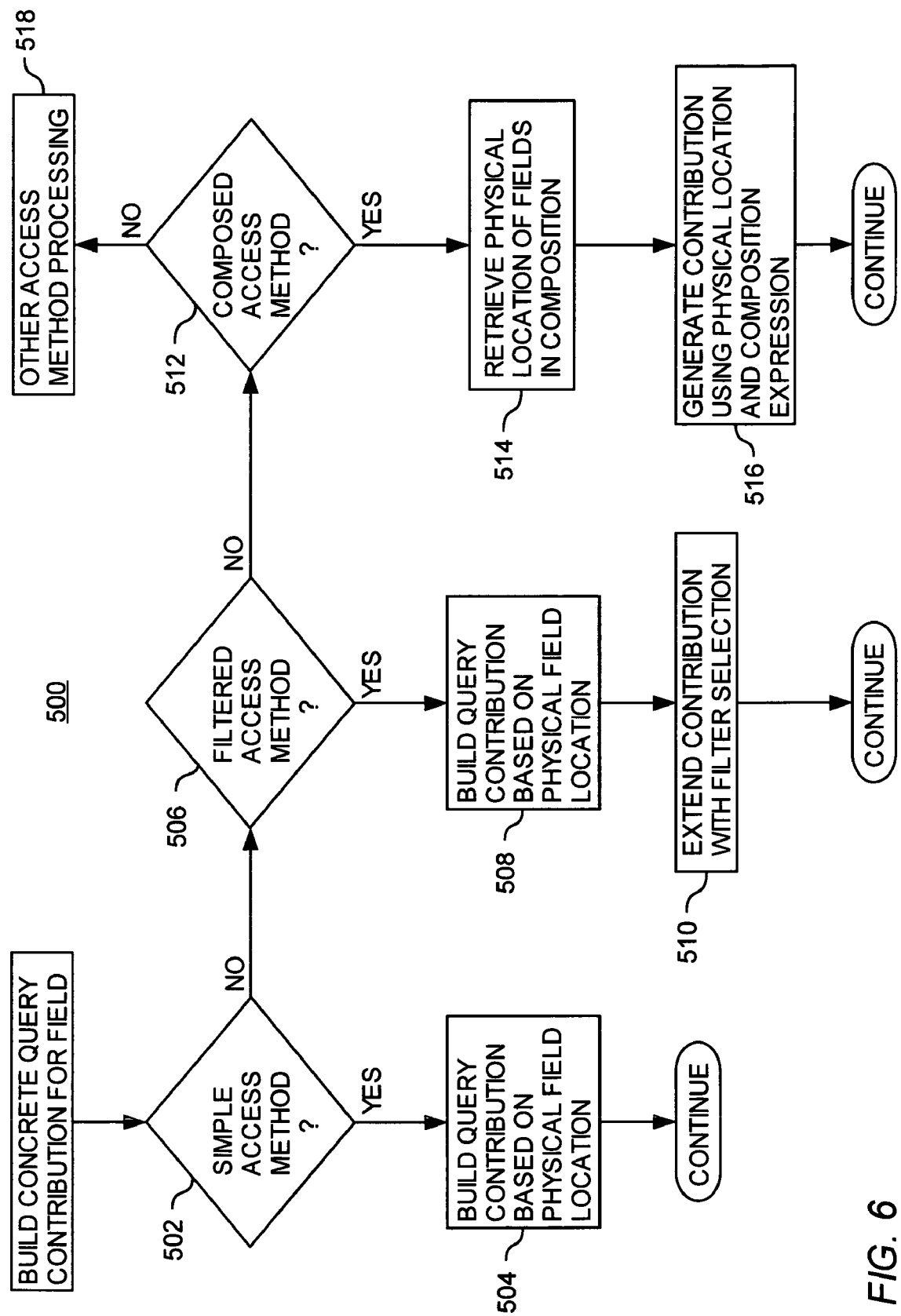

One embodiment of a method 500 for building a concrete query contribution for a logical field according to steps 410 and 418 is described with reference to FIG. 6. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Creating an Abstract Rule Set

Referring now to FIGS. 7-18, an exemplary graphical user interface (GUI) is described which illustrates one embodiment of the user interface 210 of FIG. 2. According to one aspect, the GUI displays a plurality of GUI screens which are configured for composing abstract queries, such as the abstract query 260 of FIG. 2, and/or abstract rule sets having one or more abstract rules, such as the abstract rule 265 of FIG. 2. The GUI may further display a plurality of GUI screens which are configured for accessing and/or processing existing abstract queries and/or existing abstract rule sets. In one embodiment, the GUI is implemented using Web-based technologies, such as hyperlinks.

Figure 7:
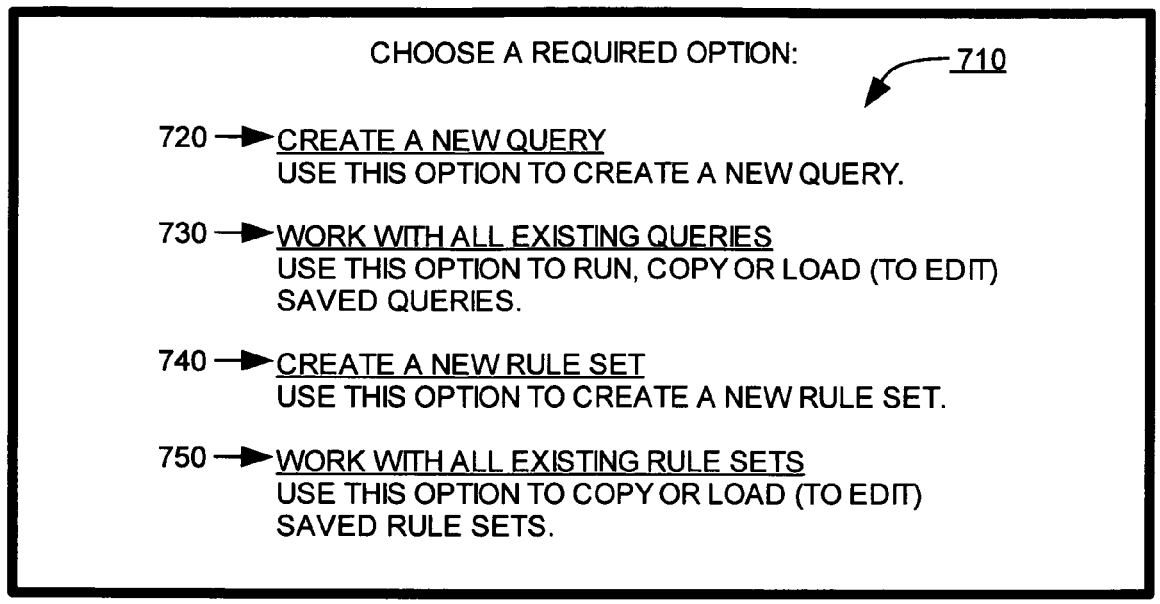

Referring first to FIG. 7, the exemplary GUI screen 700 is shown illustrating an exemplary welcome screen with a display area 710 that is configured to inform the user about available functionalities. The area 710 includes four selectable graphical elements 720, 730, 740 and 750, each being configured to allow selection of the available functionality and having an associated short description of an available functionality. Illustratively, the elements 720-750 are shown as hyperlinks each pointing to an underlying application. For example, the hyperlink 720 points to an application (e.g., the application 240 of FIG. 2) that generates GUI screens for creating a new query and the hyperlink 730 points to an application that generates GUI screens for processing existing (i.e., persistently stored) queries. Accordingly, when the user selects the hyperlink 720, the corresponding application is launched and a plurality of GUI screens is displayed which guide the user through creation of a new abstract query. Exemplary GUI screens which are configured for composing abstract queries are, by way of example, illustrated in commonly owned U.S. patent application Ser. No. 10/083,073, filed Feb. 26, 2002 entitled, "GRAPHICAL USER INTERFACE FOR BUILDING QUERIES WITH HIERARCHICAL CONDITIONS", which is incorporated herein by reference in its entirety. Selection of the hyperlink 730 is not described in more detail, for brevity.

The hyperlink 740 points to an application that generates GUI screens for creating a new abstract rule set and the hyperlink 750 points to an application that generates GUI screens for processing existing (i.e., persistently stored) rule sets. Selecting the hyperlink 750 is also not described in more detail, for brevity.

Assume now that the user selects the hyperlink 740 to create a new abstract rule set. Accordingly, an underlying application is launched for displaying a plurality of GUI screens for creation of the new abstract rule set, as described below with reference to FIGS. 8-18.

Figure 8:
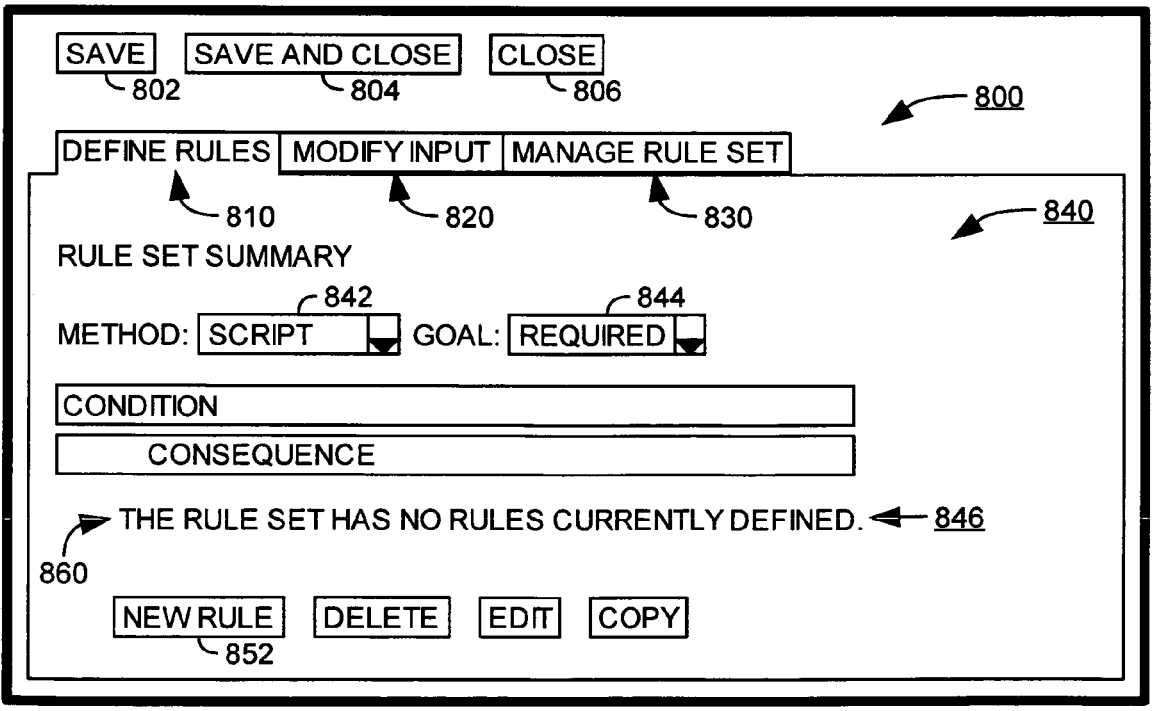

Referring now to FIG. 8, the illustrative GUI screen 700 is shown displaying a panel 800 after selection of the hyperlink 740 "Create a new Rule Set" in FIG. 7. The panel 800 is configured to allow user-specification of a new rule set and includes at its top-left end a selectable tab 810 "Define Rules". By way of example, two other selectable tabs are shown, a "Modify Input" tab 820 and a "Manage Rule Set" tab 830. When the "Modify Input" tab 820 is selected, a panel for user modification of created abstract rules is displayed. When the "Manage Rule Set" tab 830 is selected, a panel is displayed which allows the user to manage the created abstract rules, as described below with reference to FIG. 18.

Illustratively, the panel 800 includes a display area 840 "Rule Set Summary" that displays summary information with respect to the new empty rule set object. The display area 840 includes graphical selection elements 842 and 844 (illustrated as drop-down lists) for selection of a rule specification method and a requested use of the new abstract rule set. By way of example, the rule specification method is set to "Script" using the graphical selection element 842, such that the new abstract rule set is created in script form. All rules of a given rule set that is created in script form are executed in order from top to bottom as a program block or set of scripting language commands would normally be. However, other rule specification methods are also broadly contemplated and include, by way of example, the so-called "backward chaining" technique. Backward chaining is a technique well known in the art that involves running through all rules of the given rule set repeatedly until a steady state is reached or a so-called "goal" is accomplished. A goal in a backward chaining algorithm is the setting of a specific variable. Upon reaching a given value for the specific variable, the given rule set can terminate and return the given value. This is a class of algorithms used in technologies such as inference engines. By way of example, assume a series of lab tests and demographic characteristics which are input to an underlying analysis routine created in the form of a backward chaining algorithm. The lab tests and demographic characteristics allow for making preliminary diagnosis assertions using a first plurality of rules of the given rule set. As each assertion is made, other factors may become significant and other rules of the given rule set can be fired. Eventually, a point is reached where a given rule can identify a preliminary diagnosis which is the goal of the algorithm and the analysis routine returns at that point. Again, it should be noted that backward chaining algorithms and other similar artificial intelligence techniques are well known in the art. Using the graphical selection element 844, the requested use is set to "required" indicating that use of the new abstract rule set is required.

The panel 800 further includes a rule summary area 846 displaying summaries of all rules which are created for the new abstract rule set. In the given example, no abstract rule was created for the new abstract rule set. Accordingly, the rule summary area 846 merely includes an indication 860 that "The Rule Set has no rules currently defined". In order to create an abstract rule for the new abstract rule set, a pushbutton 852 "New Rule" can be clicked.

Illustratively, the GUI screen 700 further includes three pushbuttons 802, 804 and 806. By clicking the pushbutton 802 "Save", a new rule set data object can be created for the new abstract rule set and persistently stored. If the pushbutton 804 "Save and Close" is clicked, a new rule set data object is created for the new abstract rule set and persistently stored and the GUI screen 700 is closed. The pushbutton 806 "Close" can be used to close the GUI screen 700 without taking any further action.

Figure 9:
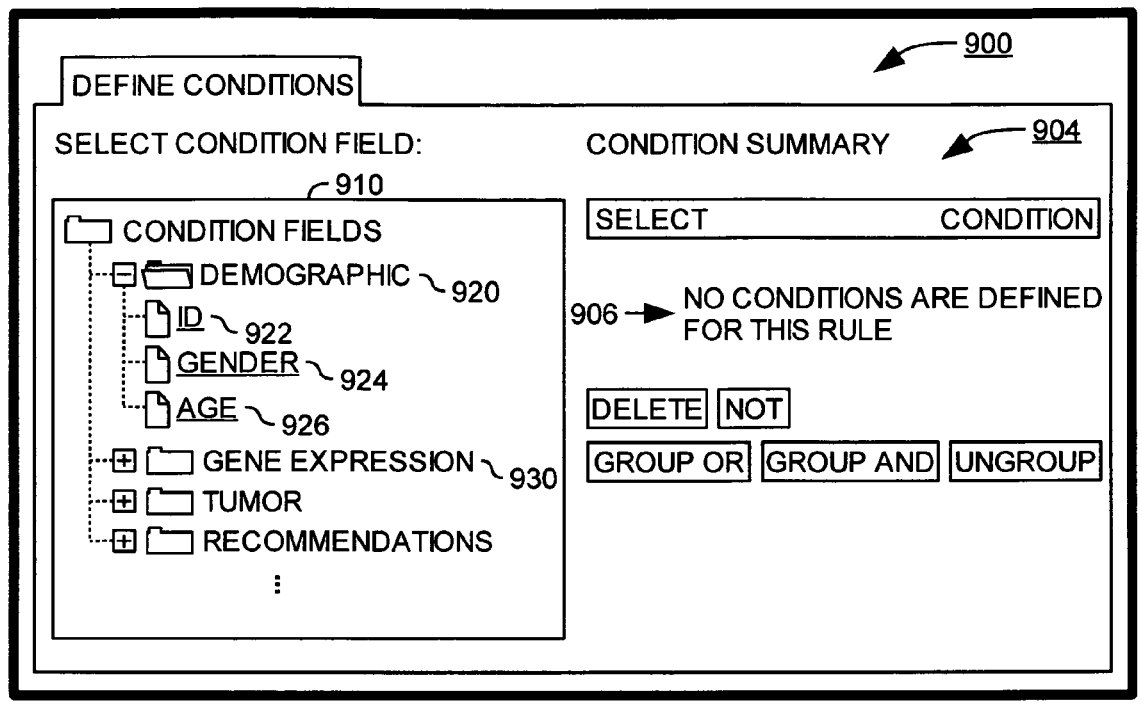

Referring now to FIG. 9, the illustrative GUI screen 700 is shown displaying a panel 900 "Define Conditions" for creation of an abstract rule after clicking the pushbutton 852 "New Rule" in FIG. 8. More specifically, the panel 900 is configured to allow user-specification of a conditional statement for the abstract rule. The conditional statement consists of one or more abstract conditions that are defined using logical fields of an underlying data abstraction model (e.g., data abstraction model 292 of FIG. 2). Accordingly, the panel 900 is configured to allow user-specification of the one or more abstract conditions for the conditional statement.

In one embodiment, the panel 900 is implemented using a panel that is configured for creation of a query condition(s) for an abstract query (e.g., abstract query 260 of FIG. 2). Accordingly, the panel 900 includes a first display area 902 "Select Condition Field:" that is configured to allow user-selection of a condition field for creation of an abstract condition. The first display area 902 displays a list of user-selectable condition fields, each corresponding to a logical field of the underlying data abstraction model. Illustratively, the list is represented as a tree 910 of folders and files, each folder representing a category of the underlying data abstraction model and each file representing a logical file included with a given category. The files of a given folder can be viewed by selecting the given folder. By way of example, the tree 910 includes a folder 920 which represents a "Demographic" category (e.g., category 310$_3$ of FIG. 4A) and a folder 930 which represents a "Gene Expression" category (e.g., category 310$_3$ of FIG. 4B), and some other exemplary folders. By selecting the folder 920, illustratively three files 922, 924, 926, respectively representing logical fields "ID", "Gender" and "Age" (e.g., logical field specifications 308$_1$-308$_3$ of FIG. 4A) are displayed.

The panel 900 further includes a second display area 904 "Condition Summary" which displays summary information with respect to the conditional statement that is created using the panel 900. However, in the given example no abstract condition was created for the conditional statement. Accordingly, the second display area 904 merely includes an indication 906 that "No conditions are defined for this rule". In order to create an abstract condition for the conditional statement, the user needs to select a condition field from the tree 910 in the first display area 902.

Figure 10:
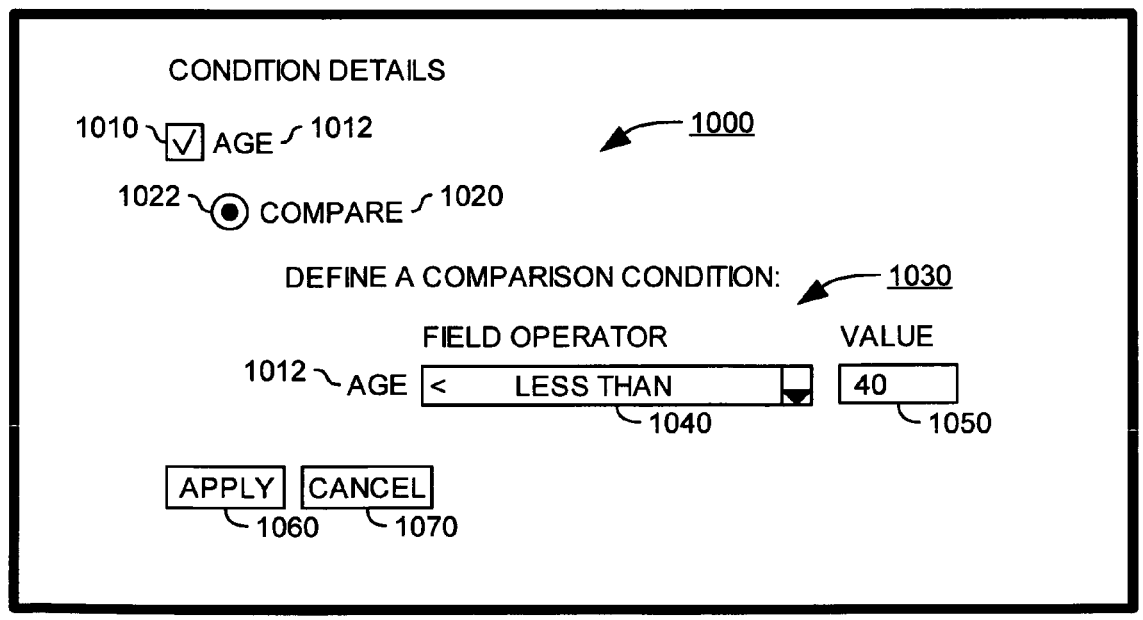

Referring now to FIG. 10, the illustrative GUI screen 700 is shown displaying a condition definition window 1000 "Condition Details" for specification of an abstract condition after selection of the file 926 corresponding to the condition field "Age" in the tree 910 of FIG. 9. The window 1000 displays an indication 1012 "Age" of the condition field that was selected for creation of the abstract condition. The indication 1012 is associated with a checkbox 1010 which is marked as being selected to indicate that the "Age" field is selected for specification of the abstract condition.

The window 1000 further displays a descriptor 1020 of a requested condition type for the abstract condition. Illustratively, the requested condition type is defined by a comparison operation "Compare" that is performed on the selected "Age" field. Furthermore, the descriptor 1020 is associated with a radio button 1022 which, when selected, enables the user to create a comparison condition using the "Age" field. In particular, when the user selects the radio button 1022 (as shown), the additional elements are enabled, allowing the user to specify a comparison operator and a value. It should be noted that only a single available condition type is shown in the window 1000, for simplicity. Accordingly, the radio button 1022 is selected by default, in one embodiment. However, in one embodiment different possible condition types are displayed in the window 1000 and can, thus, be selected using associated radio buttons. Such different possible condition types are similar to possible query condition types. One example is a range condition in which a given value is included within two other values. From a free text perspective there can be "contains" conditions and a host of others, such as "contains a synonym of", "one value 'same sentence as' another value" (the latter finds any data for which two values can be found within the same sentence), etc. Another possible condition type is "exist" which requires that a corresponding value is not null. All such different possible condition types are broadly contemplated. To this end, each possible condition type has an associated radio button and only a single condition type can be selected for the abstract condition using a corresponding associated radio button. All such implementations are broadly contemplated.

In order to allow user-specification of parameters defining the comparison operation that should be performed on the basis of the abstract condition on field values which are provided for the "Age" field, an operation definition area 1030 is displayed in the window 1000. The operation definition area 1030 displays (i) the indication 1012 of the condition field "Age" for which the comparison operation is defined, (ii) a drop-down list 1040 which is configured for selection of a comparison operator, and (iii) a text field 1050 for specification of a requested comparison value. By way of example, assume that the user selects "<less than" as the comparison operator and "40" as the comparison value. In other words, using the abstract condition each field value which is provided for the "Age" field and which is less than 40 can be identified.

Illustratively, the GUI screen 700 further includes two pushbuttons 1060 and 1070. By clicking the pushbutton 1060 "Apply", the abstract condition is created on the basis of the selections/specifications which have been determined using the window 1000. If the pushbutton 1070 "Cancel" is clicked, the window 1000 is closed without taking any further action.

Figure 11:
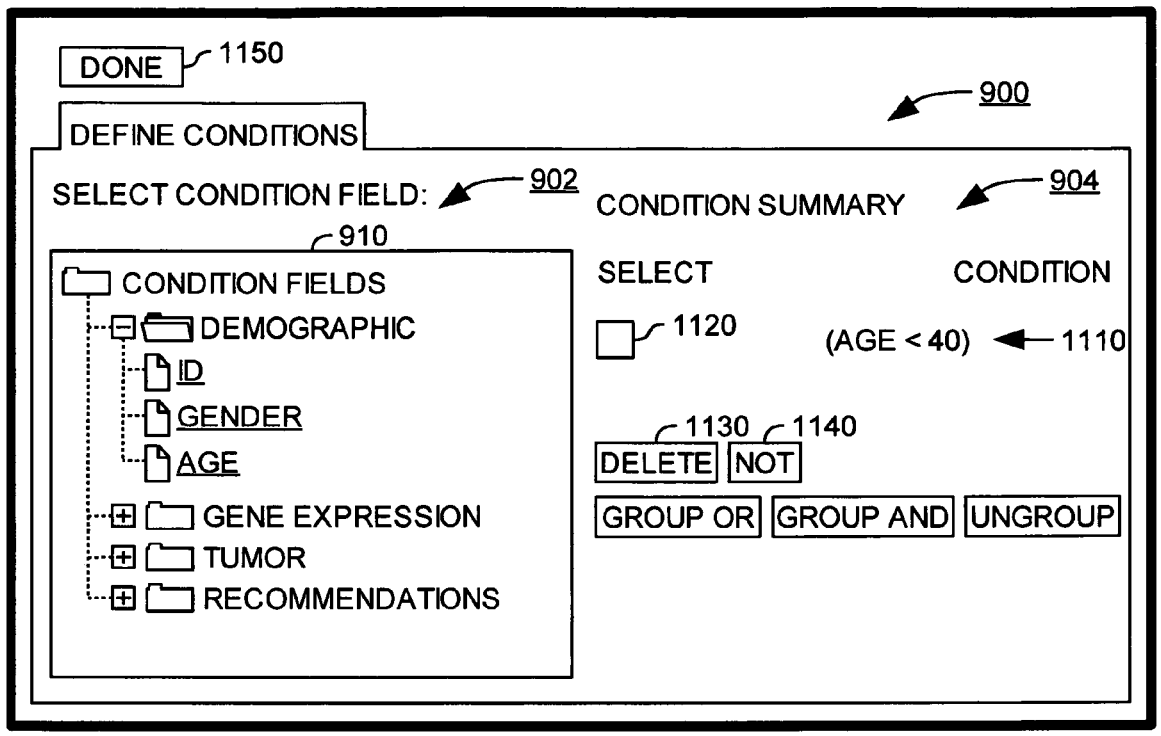

Referring now to FIG. 11, the illustrative GUI screen 700 is shown displaying the panel 900 "Define Conditions" after selection of the pushbutton 1060 "Apply" in FIG. 10. According to FIG. 11, the second display area 904 "Condition Summary" of the panel 900 now displays summary information with respect to the abstract condition which was created for the conditional statement using the window 1000 of FIG. 10. More specifically, the second display area 904 includes an indication 1110 which represents the created abstract condition, i.e., "(Age<40)". The indication 1110 is associated with a checkbox 1120 which allows the user to indicate whether the abstract condition according to the indication 1110 should be included with the conditional statement.

The second display area 904 further displays a pushbutton 1130 "Delete" and another pushbutton 1140 "NOT". The pushbutton 1130 can be clicked to delete a selected abstract condition from the conditional statement and the pushbutton 1140 can be clicked to negate a selected abstract condition. In other words, the user needs to select the created abstract condition using the checkbox 1120 in order to perform an operation according to one of the pushbuttons 1130 and 1140 thereon.

If the user has specified all abstract conditions that are required for the conditional statement, the user may click a pushbutton 1150 "DONE" to return to display of the panel 800 of FIG. 8 to continue specification of the abstract rule. Otherwise, the user may specify one or more additional abstract conditions for the conditional statement. To this end, the user simply needs to select another condition field from the tree 910 in the first display area 902 in order to create a next abstract condition for the conditional statement.

Figure 12:
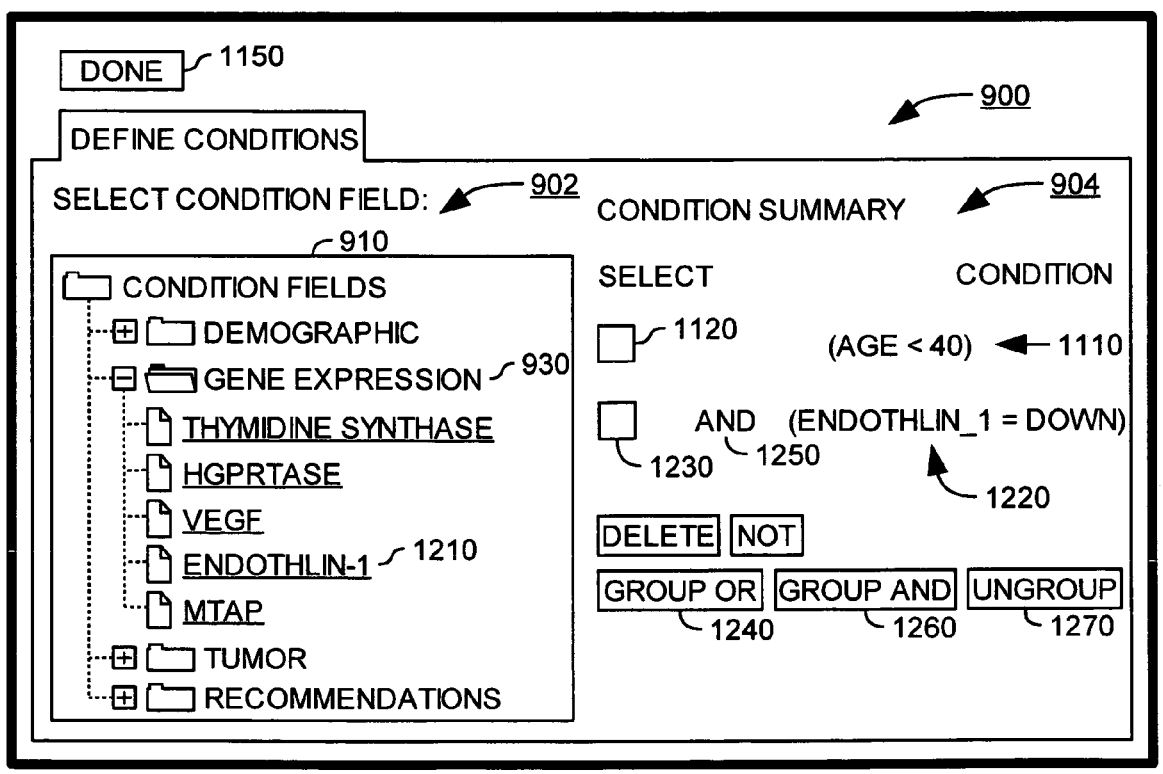

Referring now to FIG. 12, the illustrative GUI screen 700 is shown displaying the panel 900 "Define Conditions" after specification of a next abstract condition. For instance, assume that the user selected as condition field a file 1210 "Endothlin_1" from the folder 930 representing the category "Gene Expression" in the tree 910 displayed in the first display area 902. In response to selection of the condition field "Endothlin_1", a GUI screen is displayed that is similar to the GUI screen 700 of FIG. 10. For brevity, this GUI screen is not described in more detail. However, assume now that the user specifies as comparison operator "=equal to" and as comparison value "Down" using this GUI screen.

Accordingly, the second display area 904 "Condition Summary" of the panel 900 now displays (i) the indication 1110 which represents the abstract condition "(Age<40)" with the associated checkbox 1120, and (ii) an indication 1220 which represents the next abstract condition, i.e., "(Endothlin_1=Down)" with an associated checkbox 1230.

The second display area 904 further includes a group operator indication 1250 "AND" which indicates that both abstract conditions are logically combined using a Boolean AND operator. Illustratively, the AND operator can be selected by clicking a pushbutton 1240 "Group AND". However, other operators can be selected and are, thus, broadly contemplated. By way of example, the user may click a pushbutton 1260 "Group OR" to combine the abstract conditions using a Boolean OR operator or a pushbutton 1270 "Ungroup" to ungroup selected abstract conditions.

Assume now that the user has specified all abstract conditions that are required for the conditional statement. Accordingly, the user clicks pushbutton 1150 "DONE" to return to display of the panel 800 of FIG. 8 to continue specification of the abstract rule.

Referring now to FIG. 13, the illustrative GUI screen 700 is shown displaying the panel 800 after selection of the pushbutton 1150 "Done" in FIG. 12. According to FIG. 13, the rule summary area 846 now displays an indication of the abstract rule which is in the process of being created. More specifically, the rule summary area 846 displays an indication 1310 of the conditional statement (hereinafter referred to as the "conditional statement 1310", for brevity) that was created for the abstract rule of the new abstract rule set according to FIGS. 9-12. However, in the given example no consequential statement was created for the abstract rule. Accordingly, the rule summary area 846 includes an indication 1320 that prompts the user to "Add a consequence to this condition . . . ". The indication 1320 is illustratively implemented as a hyperlink which, upon selection, causes display of a plurality of GUI screens described below with reference to FIGS. 14-16. The screens of FIGS. 14-16 are configured for specification of a consequential statement for the abstract rule.

Referring now to FIG. 14, the illustrative GUI screen 700 is shown displaying the panel 900 "Define Conditions" after selection of the hyperlink 1320 "Add a consequence to this condition . . . " in FIG. 13. In one embodiment, the panel 900 is configured to allow user-specification of a consequential statement for the abstract rule. The consequential statement consists of one or more abstract recommendations (also referred to herein as "consequences") that are defined using logical fields of an underlying data abstraction model (e.g., data abstraction model 292 of FIG. 2). Each abstract recommendation can be defined in a manner that is similar to defining an abstract condition for a conditional statement of an underlying abstract rule. Accordingly, the panel 900 which was used for creation of the conditional statement according to FIGS. 9-12 can be used for creation of the consequential statement, in one embodiment. However, according to FIG. 14 the second display area 904 "Condition Summary" of the panel 900 now displays summary information with respect to the consequential statement that is created using the panel 900.

In the given example no abstract recommendation was created for the consequential statement. Accordingly, the second display area 904 merely includes an indication 1406 that "No consequences are defined for this rule". In order to create an abstract recommendation for the consequential statement, the user needs to select a condition field from the tree 910 in the first display area 902. Assume now that the user selects a file 1420 from a folder 1410 of the tree 910. Illustratively, the folder 1420 corresponds to a category "Recommendations" (e.g., category $310_4$ of FIG. 4B) and the file corresponds to a condition field "Primary Drug" (e.g., logical field specification $308_7$ of FIG. 4B).

Referring now to FIG. 15, the illustrative GUI screen 700 is shown displaying the condition definition window 1000 "Condition Details" of FIG. 10 after selection of the condition field "Primary Drug" in FIG. 14. According to FIG. 15, the window 1000 now displays an indication 1512 "Primary Drug" of the condition field that was selected for creation of the abstract recommendation. The indication 1512 is associated with a checkbox 1510 which is marked as being selected to indicate that the "Primary Drug" field is selected for specification of the abstract recommendation.

The window 1000 further displays a descriptor 1520 of a requested condition type for the abstract recommendation, which is illustratively defined by a comparison operation "Compare". The descriptor 1520 is associated with a radio button 1522 which is shown as being selected by default, as described in more detail above with reference to FIG. 10. However, it should be noted that with respect to the abstract recommendation the comparison operation is merely used to assign a recommended value to the selected condition field. In other words, in the given example the comparison operation is used to assign a recommended value to the "Primary Drug" field, as explained in more detail below. To this end, the comparison operation is set by default to the assignment parameter "=" (i.e., equal to), in one embodiment.

In order to allow user-selection of the recommended value for the selected condition field, a list 1530 of available values (e.g., values 327 of FIG. 4B) is displayed for the field, each having an associated radio button for selection thereof. Illustratively, a radio button 1540 was selected by the user to assign a value "5FU" to the selected condition field "Primary Drug". Then, by clicking the pushbutton 1060 "Apply" the abstract recommendation is created on the basis of the selections/specifications which have been determined using the window 1000 of FIG. 15.

Referring now to FIG. 16, the illustrative GUI screen 700 is shown displaying the panel 900 "Define Conditions" after selection of the pushbutton 1060 "Apply" in FIG. 15. According to FIG. 16, the second display area 904 "Condition Summary" of the panel 900 now displays summary information with respect to the abstract recommendation which was created for the consequential statement using the window 1000 of FIG. 15. More specifically, the second display area 904 includes an indication 1610 which represents the created abstract recommendation, i.e., "(Primary Drug=5FU)". The indication 1610 is associated with a checkbox 1620 which allows the user to indicate whether the abstract recommendation according to the indication 1610 should be included with the consequential statement. If not, the pushbutton 1130 "Delete" can be clicked to delete a selected abstract recommendation from the second display area 904.

If the user has specified all abstract recommendations that are required for the consequential statement, the user may click the pushbutton 1150 "DONE" to return to display of the panel 800 of FIG. 13 to continue and/or complete specification of the abstract rule. However, in one embodiment the user may specify one or more additional abstract recommendations for the consequential statement, as described above with reference to FIGS. 14-15.

Figure 17:
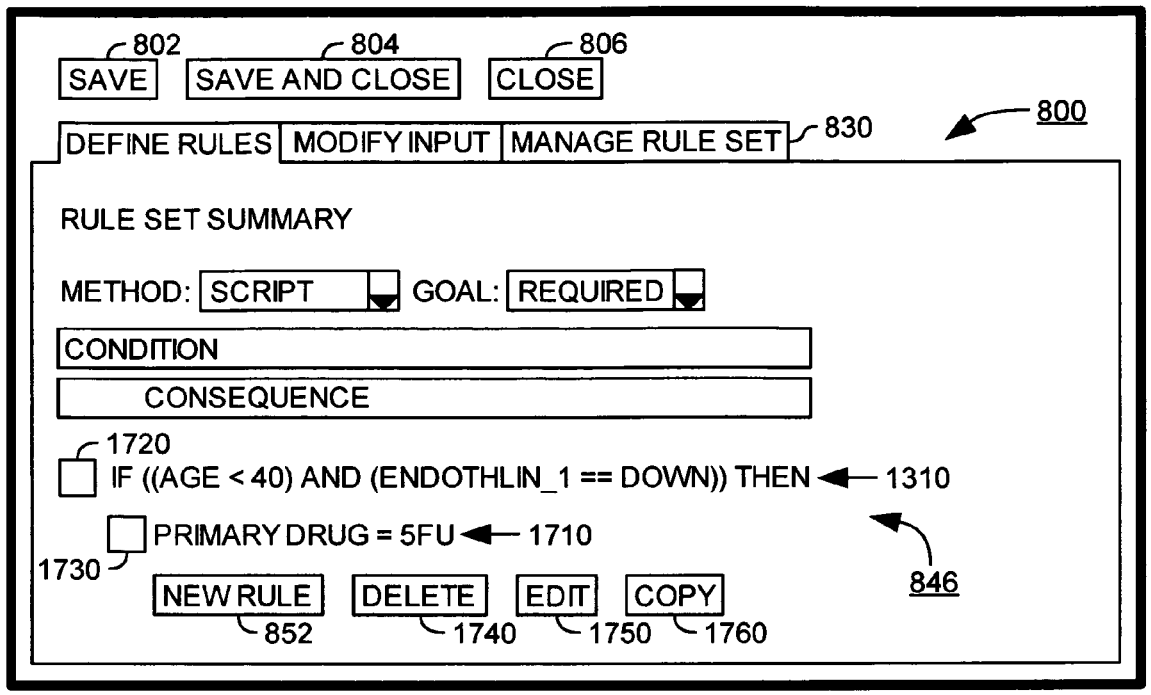

Referring now to FIG. 17, the illustrative GUI screen 700 is shown displaying the panel 800 after selection of the pushbutton 1150 "Done" in FIG. 16. According to FIG. 17, the rule summary area 846 now displays the conditional statement 1310 and an indication 1710 of the consequential statement (hereinafter referred to as the "consequential statement 1710", for brevity) that was created for the abstract rule of the new abstract rule set according to FIGS. 14-16.

The conditional statement 1310 is associated with a checkbox 1720 and the consequential statement 1710 is associated with a checkbox 1730. The checkboxes 1720 and 1730 allow separate selection of the conditional and/or the consequential statement for a required processing. For instance, if the checkbox 1720 is selected and a pushbutton 1740 "Delete" is clicked, the conditional statement 1310 is deleted. If a pushbutton 1750 "Edit" is clicked, a GUI screen is opened which allows editing of the conditional statement. Furthermore, if a pushbutton 1760 "Copy" is clicked, the conditional statement is copied, for instance, for an additional abstract rule for the new abstract rule set. The provision of copying functions made available by, e.g., the pushbutton 1760, allows the user to reuse previously composed statements in building other abstract rules. Such additional abstract rules can also be created by selecting the pushbutton 852 "New Rule". In this case, the additional abstract rules can be created as described above with reference to FIGS. 9-16.

However, for simplicity assume that the new abstract rule set should only include the abstract rule that was created as described above with reference to FIGS. 8-17. An exemplary abstract rule corresponding to this abstract rule is shown in Table III below, which, for simplicity, is described in natural language without reference to a particular encoding language.

TABLE III

ABSTRACT RULE EXAMPLE

| 001 | IF |
| 002 | ((Age < 40) AND |
| 003 | (Endothlin_1 == "Down")) |
| 004 | THEN |
| 005 | Primary Drug = 5FU |

Illustratively, the exemplary abstract rule shown in Table III includes in lines 002-003 the conditional statement which was created according to FIGS. 9-12. The consequential statement that was created according to FIGS. 14-16 is shown in line 005. By way of example, the exemplary abstract rule of Table III is implemented as an IF/THEN rule. In other words, if the conditional statement in lines 002-003 is resolved to true with respect to underlying inputs to the exemplary abstract rule, then the recommendation included with the consequential statement in line 005 is returned.

As was noted above with reference to FIG. 8, the user may now click one of the pushbuttons 802 "Save", 804 "Save and Close", or 806 "Close". If one of the pushbuttons 802 or 804 is clicked after creation of a new abstract rule(s), or if the selectable tab "Manage Rule Set" is clicked, the GUI screen 700 of FIG. 18 is displayed.

Figure 18:
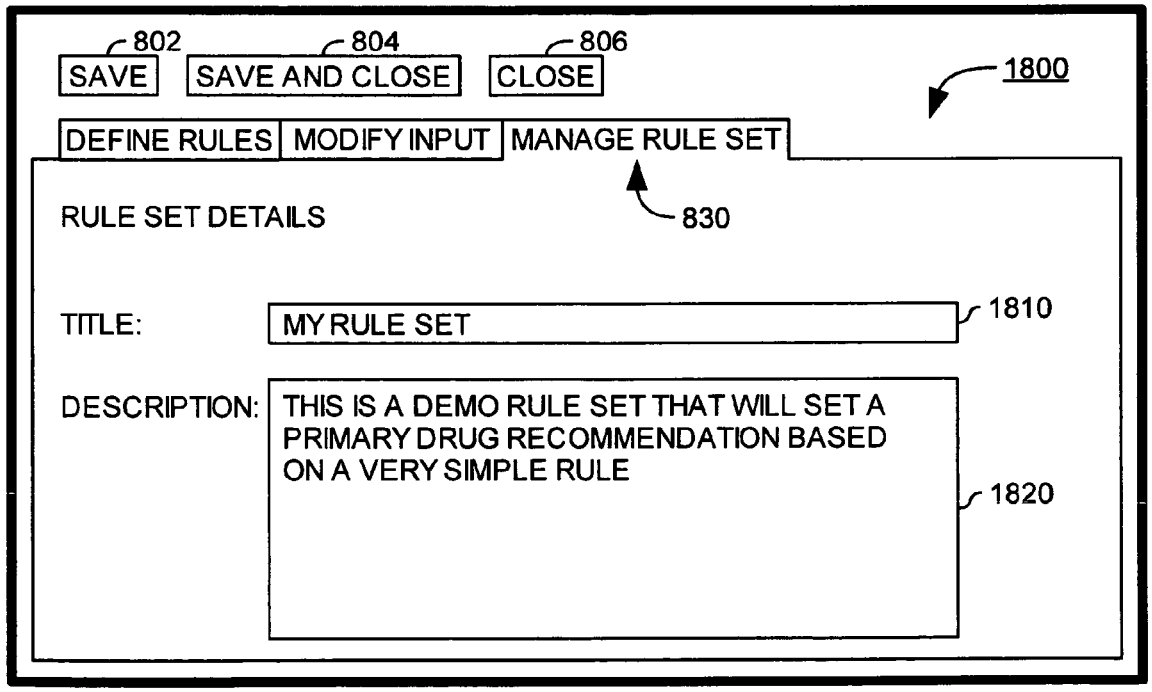

Referring now to FIG. 18, the illustrative GUI screen 700 is shown displaying a panel 1800 after selection of the selectable tab 830 "Manage Rule Set" in FIG. 17. The panel 1800 is configured to allow the user to manage the new abstract rule set which has been created as described above with reference to FIGS. 8-17.

Illustratively, the panel 1800 includes a first input field 1810 and a second input field 1820. The first input field 1810 is configured to receive user input specifying a name for the new abstract rule set. Illustratively, "My RuleSet" was entered into the first input field 1810 as name for the new abstract rule set. The second input field 1820 is configured to receive user input for a short description of the new abstract rule set. Illustratively, "This is a demo rule set that will set a primary drug recommendation based on a very simple rule." was entered into the second input field 1820 as short description for the new abstract rule set.

The user may then, again, click one of the pushbuttons 802, 804 and 806. Assume now that the user clicks the pushbutton 802 "Save" to create a new rule set data object. Accordingly, in the given example a rule set data object "My RuleSet" is created which is persistently stored. The persistently stored rule set data object "My RuleSet" includes the abstract rule illustrated in FIG. 17. Subsequently, the rule set data object "My RuleSet" can be retrieved for execution on suitable inputs, as explained in the following with reference to FIG. 19.

Generating Recommendations Using a Suitable Rules Engine

Figure 19:
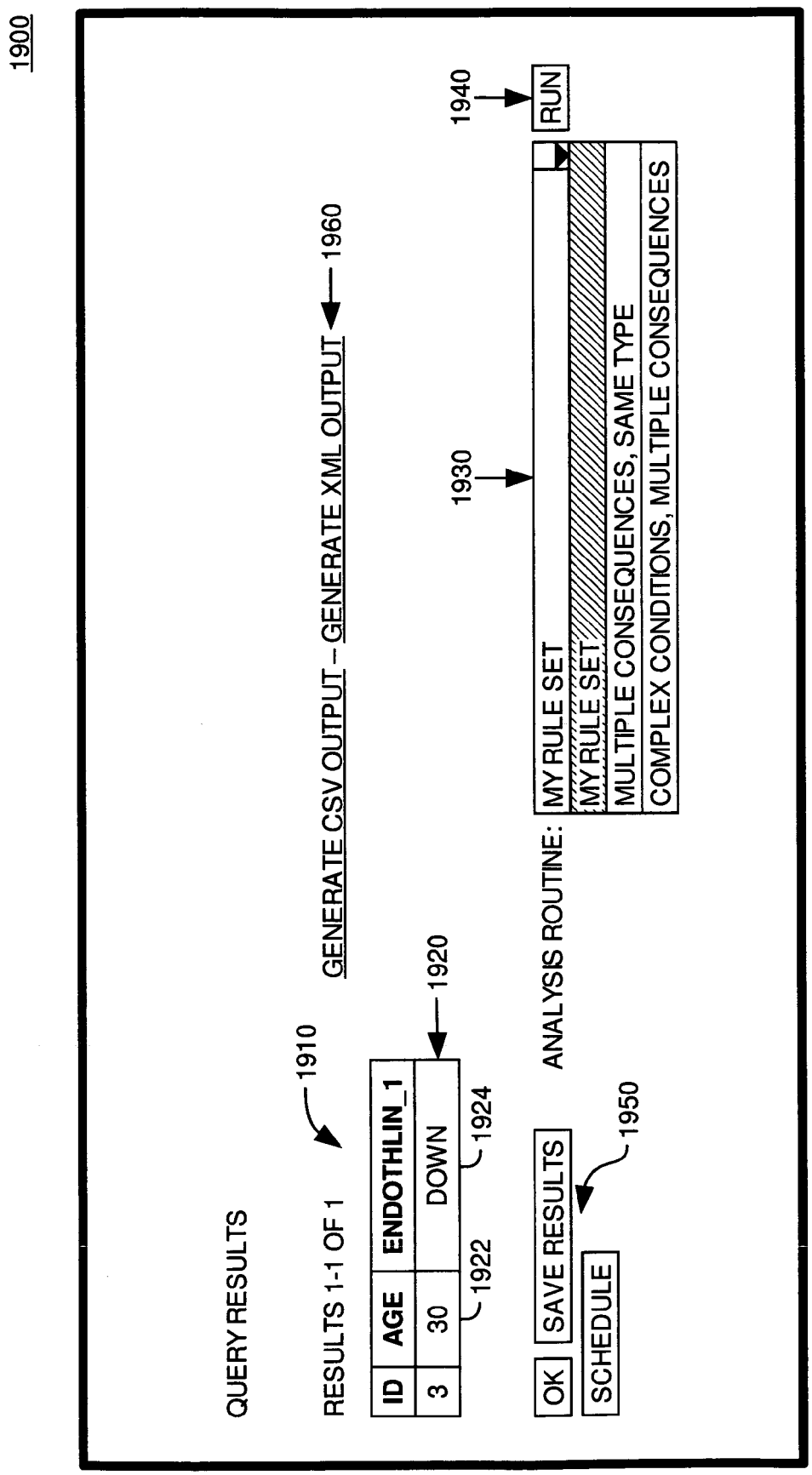
FIG. 19 is a screen shot illustrating selection of an abstract rule set for execution on a query result.

Referring now to FIG. 19, an illustrative GUI screen 1900 is shown displaying a query result 1910 and a graphical selection element 1930 for selection of an analysis routine. By way of example, the query result 1910 defines a medical condition of a patient of a medical institution. Assume now that a doctor in the medical institution wants to determine a treatment recommendation for the patient on the basis of the medical condition which is defined by the query result 1910.

According to one aspect, the query result 1910 was obtained in response to execution of an abstract query (e.g., abstract query 260 of FIG. 2) against an underlying database (e.g., database 230 of FIG. 2) having required result data. The abstract query may have been created using a suitable data request form (e.g., data request form 270 of FIG. 2), as described above with reference to FIG. 2. Accordingly, the abstract query was configured for retrieval of field values from the required result data for each condition field of the conditional statement of the exemplary abstract rule of Table III. However, it should be noted that the invention is not limited to execution of an abstract query in order to determine a suitable query result. Instead, any suitable query type including SQL and XML queries is broadly contemplated.

Illustratively, the query result 1910 includes only a single data record 1920 having three different result fields, "ID", "Age" and "Endothlin_1". In the given example, the data record 1920 includes a field value 1922 "30" for the result field "Age", which corresponds to the condition field "Age" in line 002 of Table III. The data record 1920 further includes a field value 1924 "Down" for the result field "Endothlin_1", which corresponds to the condition field in line 003 of Table III.

The query result 1910 can be stored, deleted or otherwise processed. To this end, the GUI screen 1900 illustratively displays suitable pushbuttons 1950 which are configured to initiate a requested processing. Furthermore, CSV and/or XML output can be created on the basis of the query result 1910 by clicking a corresponding one of displayed hyperlinks 1960.

In one embodiment, the query result 1910 is used as input to a requested analysis routine that is defined by one or more abstract rule sets. However, it should be noted that in one embodiment the input to the analysis routine is provided without execution of a query against an underlying database. For instance, the input is provided by a user using the user interface 210 of FIG. 2. All such different implementations are broadly contemplated.

Illustratively, the requested analysis routine can be selected by selecting an underlying abstract rule set from the graphical selection element 1930, which is illustratively implemented as a drop-down list. The drop-down list 1930 includes a list of available persistently stored abstract rule sets which can be selected for execution on the query result 1910. By way of example, the abstract rule set "My RuleSet" that was created according to FIGS. 8-18 above is selected. Assume now that the abstract rule set "My RuleSet" is configured to return a suitable treatment recommendation. Assume further that the doctor in the given medical institution executes the requested analysis routine which is defined by the abstract rule set "My RuleSet" on the query result 1910 to determine the treatment recommendation for the given patient.

The requested analysis routine is executed on the query result 1910 by clicking a pushbutton 1940 "RUN". As was noted above, the abstract rule set "My RuleSet" which defines the requested analysis routine only includes the exemplary abstract rule of Table III. In other words, in the given example execution of the exemplary abstract rule of Table III is initiated by clicking the pushbutton 1940. An exemplary method of executing the abstract rule of Table III on the query result 1910 is described below with reference to FIG. 20.

It should be noted that the GUI screen 1900 is merely illustrated by way of example and that various other implementations are possible. For instance, in one embodiment the user may initially select the requested analysis routine by selecting the underlying abstract rule set from the drop-down list 1930. Then, in response to clicking the pushbutton 1940 "RUN", a data request form (e.g., data request form 270 of FIG. 2) is displayed to the user. As was noted above, the data request form can be configured to guide the user through selection of suitable result fields for an abstract query which are configured to retrieve all field values that are required as inputs to the selected analysis routine. After user-specification of the abstract query using the data request form, the abstract query is executed and the query result 1910 is obtained. The selected analysis routine is then executed on the query result 1910 as described above. It is understood that all such different implementations are broadly contemplated.

Figure 20:
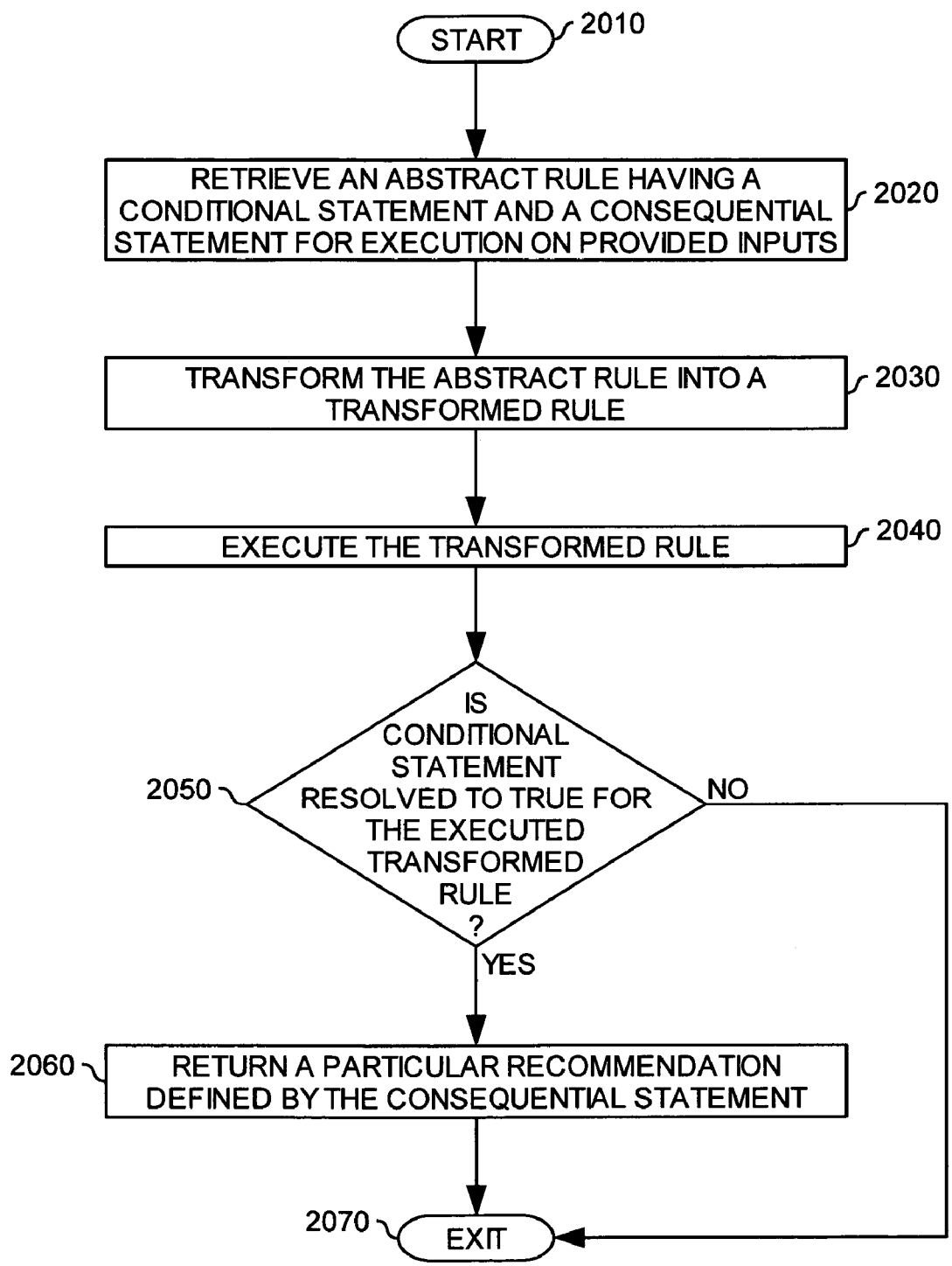
FIG. 20 is a flow chart illustrating a method of generating recommendations using a suitable rules engine in one embodiment.

Referring now to FIG. 20, an exemplary method 2000 of generating recommendations using a suitable rules engine (e.g., rules engine 280 of FIG. 2) is illustrated. At least part of the steps of method 2000 are performed using an abstract rule translator (e.g., abstract rule translator 298 of FIG. 2), an application (e.g., application 240 of FIG. 2) and an abstract model interface (e.g., abstract model interface 290 of FIG. 2). In one embodiment, the method 2000 is performed in response to a click on pushbutton 1940 of the exemplary GUI screen 1900 of FIG. 19. Method 2000 starts at step 2010.

At step 2020, all abstract rules defining a selected analysis routine are retrieved for execution on provided inputs. Each retrieved abstract rule has a conditional statement and a consequential statement. In the given example, the selected analysis routine is defined by the abstract rule set "My RuleSet" and the provided inputs are defined by the field values 1922 and 1924 of the query result 1920 according to FIG. 19. Accordingly, only the abstract rule of Table III is retrieved for execution on the field values "30" and "Down". By way of example, the following steps of the method 2000 are explained with reference to the given example.

At step 2030, the abstract rule of Table III is transformed into a transformed rule. In one embodiment, the transformed rule is executable by the suitable rules engine. An exemplary method of transforming an abstract rule into a transformed rule is described in more detail below with reference to FIGS. 21-24.

According to one aspect, transforming the abstract rule into the transformed rule includes generating an output template for the selected analysis routine. The output template includes a plurality of tags, one for each possible output of the selected analysis routine. Thus, the output template can be completed with suitable outputs defined by the selected analysis routine after execution of the selected analysis routine on the provided inputs, and returned as analysis result. However, any suitable implementation that allows an obtained analysis result to be returned is broadly contemplated.

At step 2040, the transformed rule is executed on the query result of Table III by the suitable rules engine. At step 2050, it is determined whether the conditional statement in lines 002-003 of the abstract rule of Table III resolves to true with respect to the field values 1922 and 1924 of FIG. 19. If the conditional statement is not resolved to true, method 2000 exits at step 2070. If, however, the conditional statement is resolved to true, method 2000 continues at step 2060. In the given example, the field values 1922 and 1924 of the query result 1910 satisfy the conditional statement of lines 002-003 of Table III, i.e., the Age is less than 40 years and the Endothlin-1 gene is down. Accordingly, the conditional statement is resolved to true and the method 2000 continues at step 2060.

At step 2060, the abstract rule of Table III fires. In other words, a particular recommendation defined by the consequential statement of the abstract rule of Table III is returned. In the given example, the recommendation of line 005 of Table III is returned to the doctor, i.e., the recommendation to prescribe for the patient as primary drug the drug 5FU. Method 2000 then exits at step 2070.

Transforming an Abstract Rule Into a Transformed Rule

Figure 21:
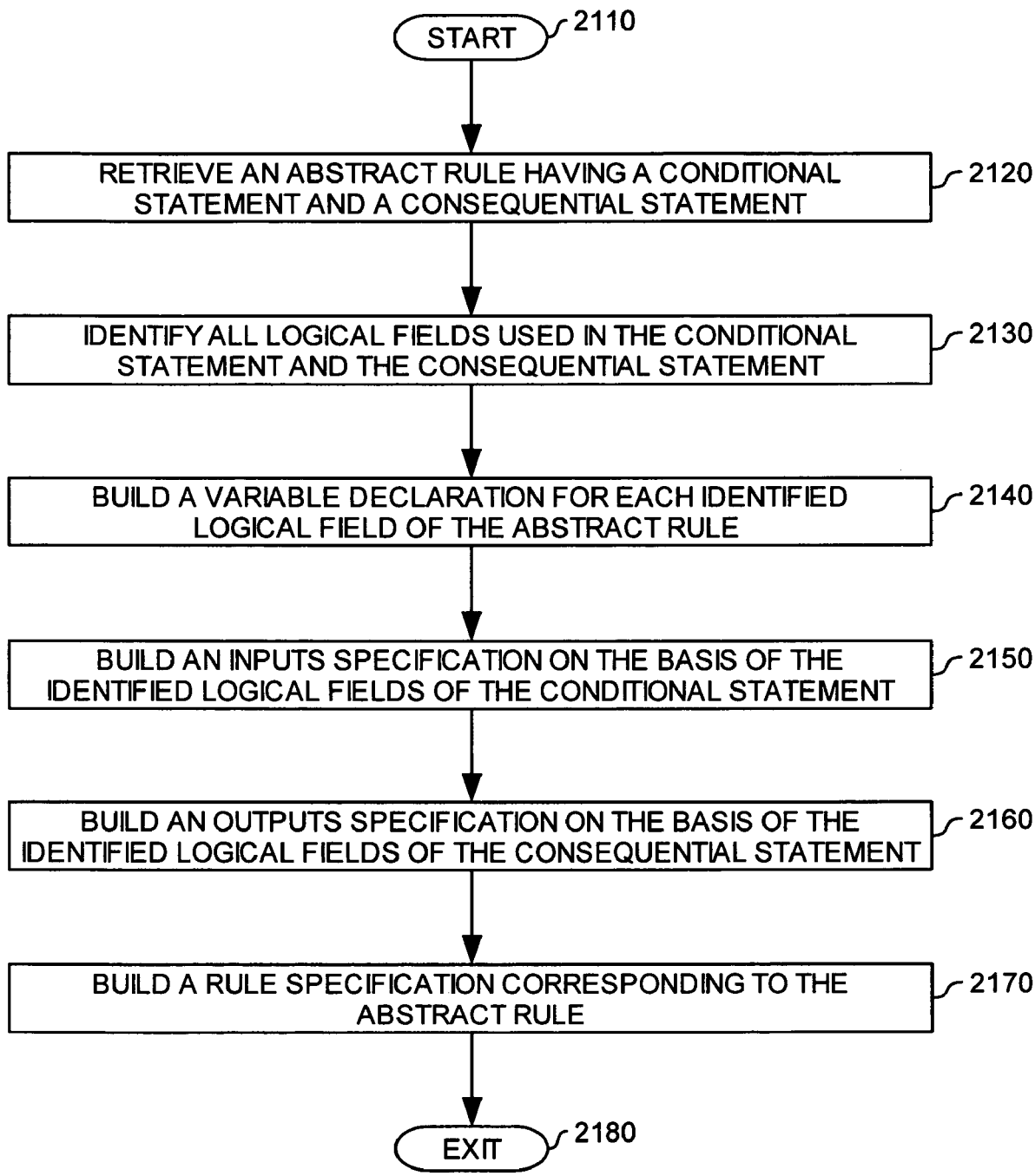
FIG. 21 is a flow chart illustrating a method of transforming an abstract rule into a transformed rule in one embodiment.

Referring now to FIG. 21, an exemplary method 2100 of transforming an abstract rule (e.g., abstract rule 265 of FIG. 2) into a transformed rule is illustrated. At least part of the steps of method 2100 are performed using a suitable abstract rule translator (e.g., abstract rule translator 298 of FIG. 2) and an underlying data abstraction model (e.g., data abstraction model 292 of FIG. 2). In one embodiment, the method 2100 is entered from step 2030 of the method 2000 of FIG. 20. By way of example, the method 2100 is explained with respect to transformation of the abstract rule of Table III above into a transformed rule that is accepted by a suitable rules engine (e.g., rules engine 280 of FIG. 2). The transformed rule is described with reference to the ABLE rule language (ARL) which is accepted by a multiplicity of available rules engines. However, any other suitable language is broadly contemplated. Method 2100 starts at step 2110.

At step 2120, the abstract rule of Table III is retrieved for transformation. For instance, the suitable abstract rule translator retrieves the abstract rule from an underlying database (e.g., database 230 of FIG. 2). In one embodiment, the retrieved abstract rule is defined in a computer-readable language, such as XML. However, any suitable computer-readable language is broadly contemplated.

At step 2130, all conditions fields are identified from the conditional statement in lines 002-003 and the consequential statement in line 005 of the exemplary abstract rule of Table III. In the given example, the condition fields "Age" and "Endothlin_1" are identified from the conditional statement. The condition field "Primary Drug" is identified from the consequential statement. Furthermore, all logical field specifications from the underlying data abstraction model which are referenced by the identified condition fields are determined. For instance, the logical field specification 3086 "Endothlin_1" of FIG. 4B is determined with respect to the condition field "Endothlin_1" and the logical field specification 3087 "Primary Drug" of FIG. 4B is determined with respect to the condition field "Primary Drug".

At step 2140, a variable declaration is created for each identified condition field. To this end, all data types of the referenced logical field specifications are determined from the underlying data abstraction model. In the given example, the data type "Categorical" is determined for the logical field specifications "Endothlin_1" and "Primary Drug" according to the type attributes 326 and 328 in FIG. 4B. Assume further that the data type "Integer" is determined for the logical field specification "Age" (e.g., data type 324 of FIG. 4A). Furthermore, any retrievable enumeration of valid values for each one of the referenced logical field specifications is determined from the underlying data abstraction model. For instance, the valid values "up", "weak" and "down" are determined from the "Endothlin_1" field specification $308_6$ of FIG. 4B. On the basis of the determined referenced logical field specifications, the determined data types and enumerations of valid values, corresponding variable declarations are generated as described in more detail below with reference to FIG. 22.

At step 2150, an inputs specification is created for the identified condition fields of the conditional statement on the basis of the referenced logical field specifications. Furthermore, at step 2160 an outputs specification is created for the identified condition fields of the consequential statement. Creation of the inputs specification and the outputs specification in the given example is described in more detail below with reference to FIG. 23.

At step 2170, a rule specification is created for the IF/THEN statement defined by the abstract rule of Table III. Creation of the rule specification in the given example is described in more detail below with reference to FIG. 24.

The variable declaration, the inputs specification, the outputs specifications and the rule specification define the transformed rule which is accepted by the suitable rules engine. Method 2100 then exits at step 2180.

Figure 22:
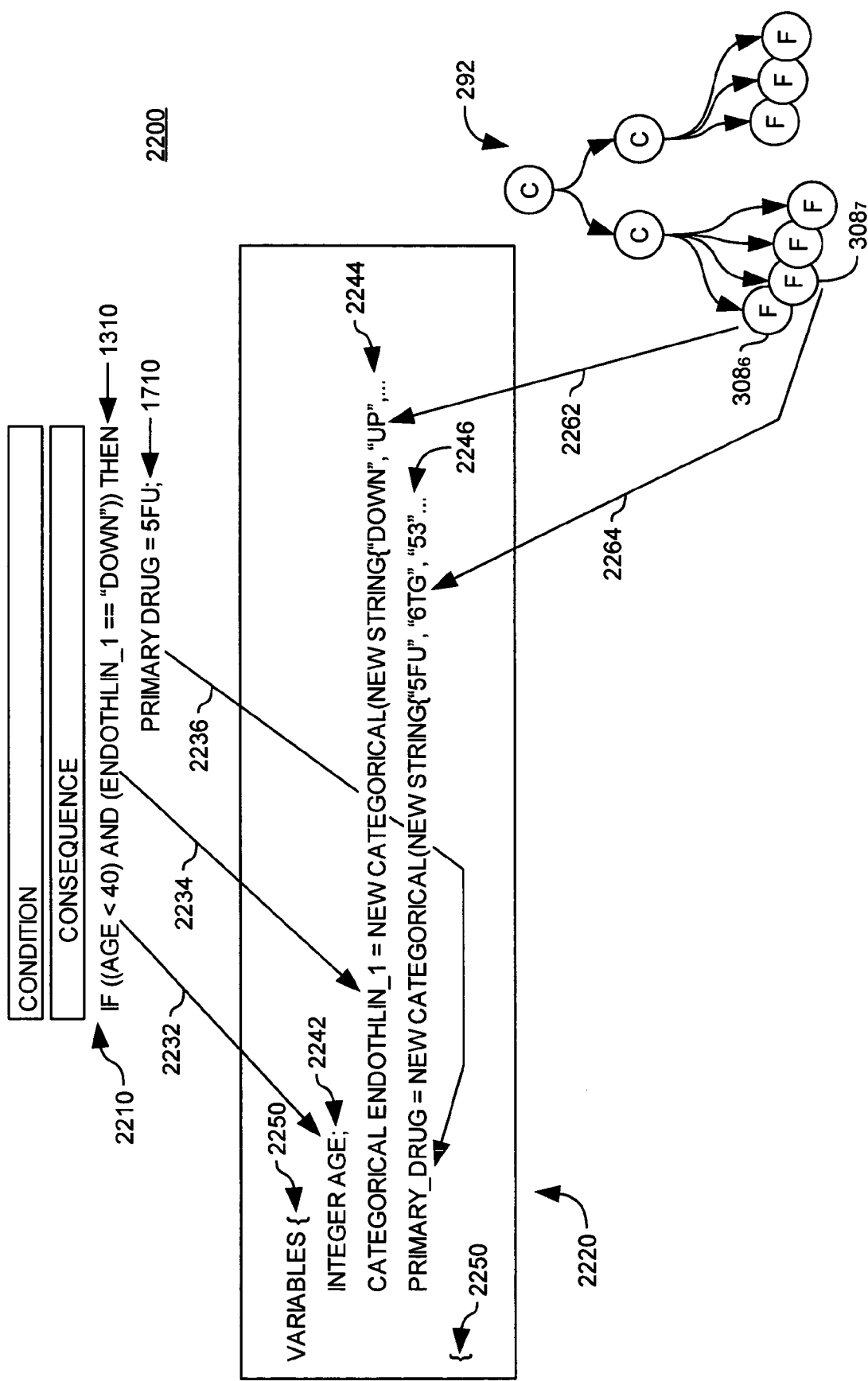

Referring now to FIG. 22, a schematic diagram 2200 is shown which illustrates generation of variable declarations for the identified condition fields "Age", "Endothlin_1" and "Primary Drug" in the given example. The schematic diagram 2200 includes an illustration 2210 of the abstract rule of Table III above, having the conditional statement 1310 according to FIG. 13 and the consequential statement 1710 according to FIG. 17. The schematic diagram further includes a schematic illustration of the data abstraction model 292 of FIGS. 2-4B with the logical field specifications 3086 and 3087. Furthermore, the schematic diagram 2200 includes a variable declaration 2220 for the identified condition fields. As was noted above, the variable declaration 2220 is generated in the ABLE rule language (ARL) by way of example.

The variable declaration 2220 includes a generic section 2250 which indicates that all enclosed code in the declaration 2220 defines variables of the transformed rule. For each condition field which has no enumeration of valid values, a variable is declared according to the determined data type of the field. In the given example, a variable 2242 "Integer Age" is declared for the condition field "Age", as illustrated by an arrow 2232. For each condition field which has an enumeration of valid values, a corresponding definition including the enumeration of valid values is declared according to the determined data type. In the given example, a definition 2244 "Categorical Endothlin_1=new Categorical(new String{"Down", "Up", "Weak"}))" is created for the condition field "Endothlin_1", as illustrated by an arrow 2234. Similarly, a definition 2246 is created for the condition field "Primary Drug", as illustrated by an arrow 2236. The definitions 2244 and 2246 include enumerations of corresponding valid values, which are retrieved from the referenced logical field specifications 3086 and 3087, as illustrated by arrows 2262 and 2264.

Referring now to FIG. 23, a schematic diagram 2300 is shown which illustrates generation of an inputs and an outputs specification for the identified condition fields "Age", "Endothlin_1" and "Primary Drug" in the given example. The schematic diagram 2300 includes the illustration 2210 of the abstract rule having the conditional statement 1310 and the consequential statement 1710 according to FIG. 22. The schematic diagram further includes an inputs and outputs declaration 2310 for the identified condition fields. As was noted above, the inputs and outputs declaration 2310 is generated in the ABLE rule language (ARL), by way of example.

The inputs and outputs declaration 2220 illustratively includes an inputs specification 2332 and an outputs specification 2334. In the inputs specification 2332, all logical field specifications that are referenced by condition fields included with the conditional statement 1310 are declared, as illustrated by arrows 2322 and 2324. Accordingly, in the given example the inputs specification 2332 is defined as "inputs{Age, Endothlin_1};". In the outputs specification 2334, all logical field specifications that are referenced by condition fields included with the consequential statement 1710 are declared, as illustrated by an arrow 2326. Accordingly, in the given example the outputs specification 2334 is defined as "outputs{Primary Drug};".

Referring now to FIG. 24, a schematic diagram 2400 is shown which illustrates generation of a rules specification for the IF/THEN statement that is defined by the abstract rule of Table III in the given example. The schematic diagram 2400 includes the illustration 2210 of the abstract rule having the conditional statement 1310 and the consequential statement 1710 according to FIG. 22, which form the IF/THEN statement. The schematic diagram further includes a rules specification 2410 of the IF/THEN statement in the ABLE rule language (ARL), by way of example.

The rules specification 2410 illustratively includes a generic section 2420 which indicates that all enclosed code in the specification 2410 defines IF/THEN statements of the transformed rule. Furthermore, the specification 2410 includes a statement 2430 defining the IF/THEN statement that is defined by the abstract rule of Table III in the given example. More specifically, the statement 2430 includes a specification 2432 of the conditional statement 1310, as illustrated by an arrow 2442, and a specification 2434 of the consequential statement 1710, as illustrated by an arrow 2444.

It should be noted that rule creation using the ABLE rule language is well-known in the art. Therefore, a more detailed description of the transformation of the abstract rule into the transformed rule is not necessary.

Managing Execution of an Analysis Routine

Figure 25:
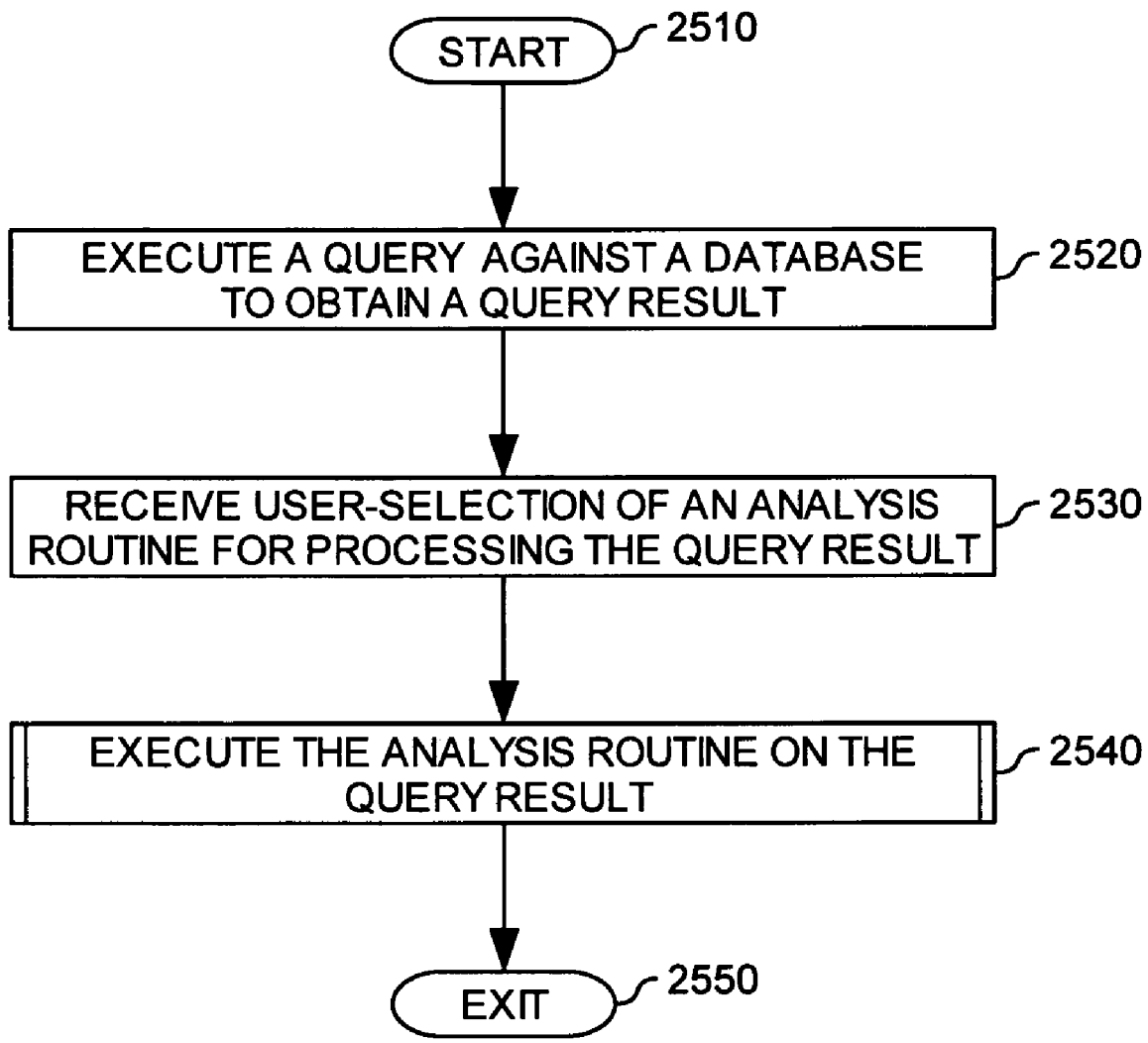
FIG. 25 is a flow chart illustrating a method of executing an analysis routine on a query result.

Referring now to FIG. 25, an exemplary method 2500 of managing execution of an analysis routine on a query result (e.g., query result 1910 of FIG. 19) is illustrated. At least part of the steps of method 2500 are performed using a suitable user interface (e.g., user interface 210 of FIG. 2). Method 2500 starts at step 2510.

At step 2520, a query (e.g., abstract query 260 of FIG. 2) is executed against an underlying database (e.g., database 230 of FIG. 2) to obtain a query result (e.g., result set 282 of FIG. 2). By way of example, assume that a user such as a doctor in a medical institution creates a query to obtain age information for a given patient from a database of the medical institution. Accordingly, if the doctor identifies the given patient using an associated patient identifier such as "2", and if the given patient is 30 years old, the exemplary query result of Table IV below can be obtained.

TABLE IV

QUERY RESULT EXAMPLE

| 001 | ID | Age |
|---|---|---|
| 002 | 2 | 30 |

Illustratively, the exemplary query result shown in Table IV comprises identifier ("ID") and age ("Age") information for the given patient in line 002.

At step 2530, user-selection of an analysis routine for execution on the query result is received. For simplicity, assume that the analysis routine is selected as described above with reference to FIG. 19. In other words, in the given example the selected analysis routine is defined by the abstract rule set "My RuleSet" which is defined by the abstract rule of Table III above.

At step 2540, the selected analysis routine is executed on the query result. In other words, in the given example the abstract rule of Table III is executed on the query result of Table IV. An exemplary method for managing execution of the selected analysis routine on the query result is described in more detail below with reference to FIG. 26. Method 2500 then exits at step 2550.

Figure 26:
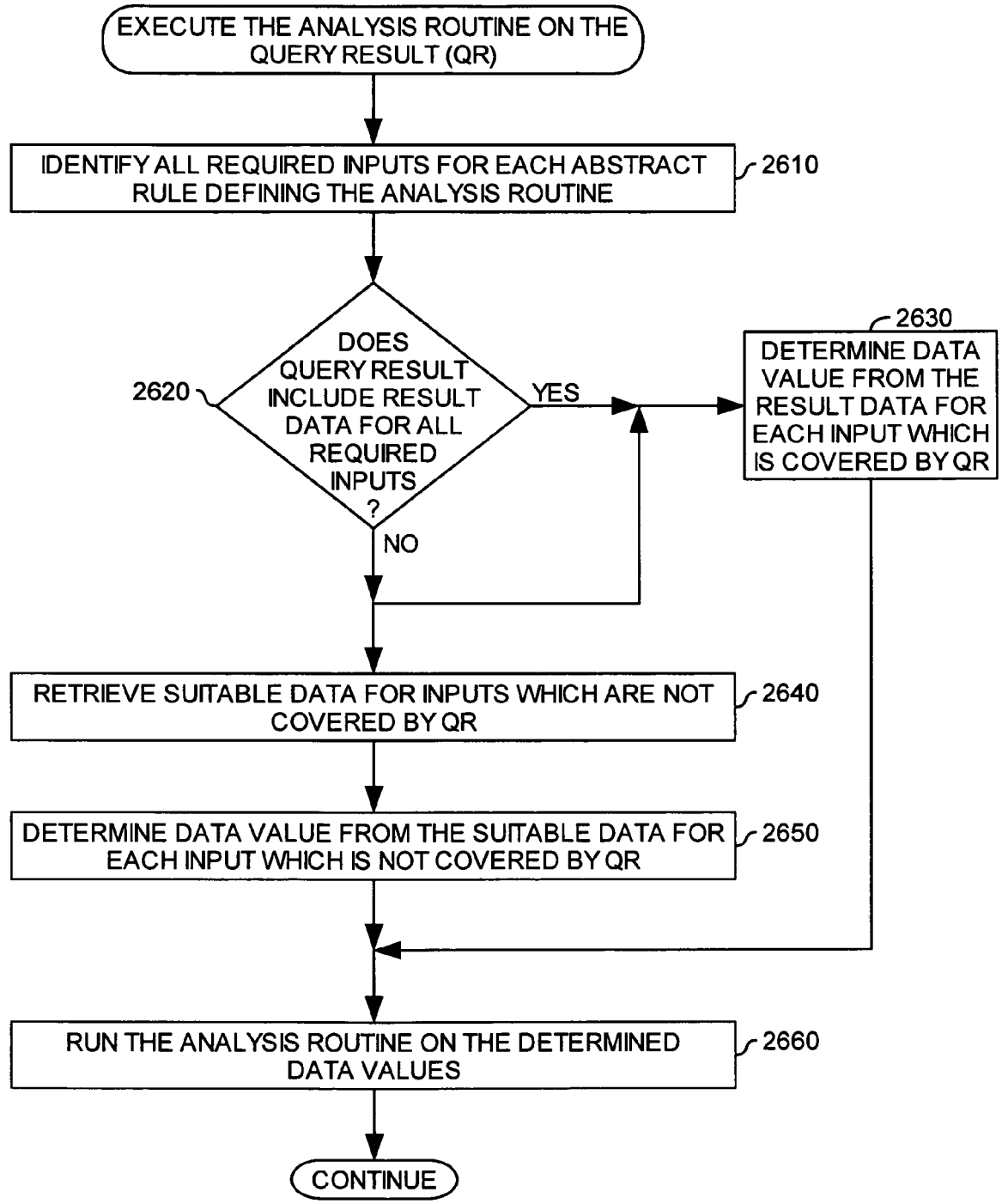
FIG. 26 is a flow chart illustrating a method of retrieving suitable data required as input to an analysis routine.

Referring now to FIG. 26, an exemplary method 2600 of managing execution of a selected analysis routine is illustrated. By way of example, method 2600 is explained with reference to the given example, in which the abstract rule of Table III is executed on the query result of Table IV.

Method 2600 starts at step 2610, where all required inputs are identified for each abstract rule defining the selected analysis routine. As was noted above, in the given example required inputs to the abstract rule of Table III are field values for the condition fields "Age" (line 002 of Table III) and "Endothlin_1" (line 003 of Table III).

At step 2620, it is determined whether the query result includes result data for all required inputs. If the query result includes result data for all required inputs, corresponding field values are determined from the result data for each required input. Processing then continues at step 2660. If, however, the query result does not include result data for each required input, step 2630 is performed for all field values included with the result data which can be used as inputs to the abstract rule and processing then continues at step 2640. In the given example, only the field value "30" for the "Age" field according to line 002 of the exemplary query result of Table IV can be determined as input to the "Age" condition field of the abstract rule of Table III (line 002) at step 2630, before processing continues at step 2640.

At step 2640, suitable data is retrieved for inputs of the abstract rule for which no field values can be determined from the query result. In the given example, the exemplary query result of Table IV does not include a field value which is suitable as input to the condition field "Endothlin_1" of the abstract rule of Table III (line 003). In one embodiment, this field value can be determined by issuing a suitable query against the underlying database. In the given example, a query which requests for "Endothlin_1" gene expression values for the given patient having the identifier "2" can be generated and issued against the database of the medical institution. Thus, suitable data having at least one data value which can be used as field value defining the input to the "Endothlin_1" condition field of the abstract rule of Table III (line 003) can be retrieved.

At step 2650, the field value defining the input to the "Endothlin_1" condition field is determined from the suitable data. Assume now, that the suitable data only includes a single data value "Down", which is thus determined as the field value. Processing then continues at step 2660. However, it should be noted that the suitable data may include a multiplicity of data values which may potentially be used as the field value defining the input. Accordingly, in one embodiment the user, i.e., in the given example the doctor can be prompted to select one of the multiplicity of data values as the field value. In another embodiment, a point in time of current execution of the analysis routine can be identified. Then, a data value of the multiplicity of data values that was obtained at a point in time being the closest point in time before the identified point in time can be identified as the field value defining the required input. Still another embodiment is described below with reference to FIGS. 27-28. All such implementations are broadly contemplated.

At step 2660, the selected analysis routine is run on all determined field values which define the required inputs to the analysis routine. In the given example, the abstract rule of Table III is run on the field value "30" for the "Age" condition field and the field value "Down" for the "Endothlin_1" condition field as described above. Processing then returns to step 2550 of FIG. 25.

Validating Inputs to an Analysis Routine

Figure 27:
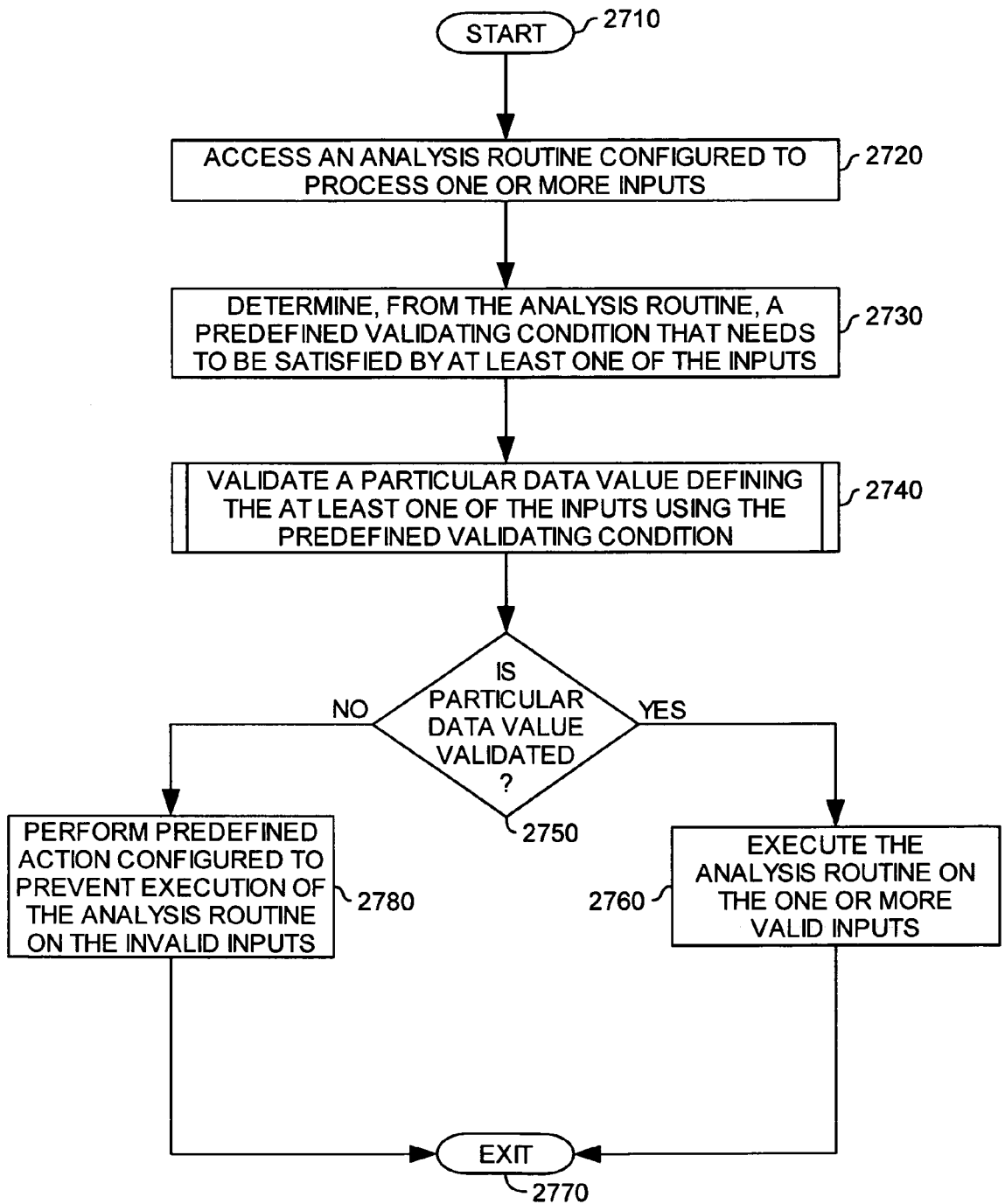
FIG. 27 is a flow chart illustrating a method of executing an analysis routine on valid inputs.

Referring now to FIG. 27, an exemplary method 2700 of managing execution of a selected analysis routine on one or more inputs is illustrated. The method 2700 is configured to validate at least one of the one or more inputs as valid input(s) to the selected analysis routine.

In one embodiment, the method 2700 is performed when the pushbutton 1940 "Run" in the exemplary GUI screen 1900 of FIG. 19 is clicked as described above. In this case, the one or more inputs are defined by the query result 1910 of FIG. 19 and the selected analysis routine is defined by the abstract rule of Table III. In the following, the method 2700 is exemplified with respect to this example. However, it should be noted that the one or more inputs can be any suitable inputs, such as inputs provided by a user using the user interface 210 of FIG. 2. All such implementations are broadly contemplated. Method 2700 starts at step 2710.

At step 2720, the selected analysis routine which is configured to process the one or more inputs is accessed. In the given example, the abstract rule of Table III is retrieved, e.g., from an underlying database (e.g., database 230 of FIG. 2), and accessed.

At step 2730, a predefined validating condition that needs to be satisfied by at least one of the one or more inputs is determined from the analysis routine. In one embodiment, the predefined validating condition is determined from at least one abstract rule of an abstract rule set defining the selected analysis routine. For instance, assume that in the given example the abstract rule of Table III includes a predefined validating condition on the "Endothlin_1" condition field (line 003 of Table III). Assume further that the predefined validating condition requests that only a most recent field value of an available series of field values should be used as input to the selected analysis routine with respect to the "Endothlin_1" condition field. Alternatively, the predefined validating condition may request that the field value which is used as the input should be included within a predefined valid value range. All such embodiments are broadly contemplated.

At step 2740, a particular data value defining the at least one of the one or more inputs is validated using the predefined validating condition. In the given example, assume that the particular data value is the field value 1924 of FIG. 19, i.e., the value "down" which is determined by the query result 1910 as input to the selected analysis routine with respect to the "Endothlin_1" condition field in line 003 of Table III. An exemplary method of validating a data value using a predefined validating condition is described in more detail below with reference to FIG. 28.

At step 2750, it is determined whether the particular data value was validated using the predefined validating condition, i.e., whether the particular data value is a valid value. If the particular data value is a valid value, processing continues at step 2760, where the selected analysis routine is executed on the one or more inputs. For instance, assume that in the given example the predefined validating condition is configured to validate the particular data value only if the value is a most recent value. Accordingly, if the particular data value "Down" is the most recent value, the abstract rule of Table III is executed on the query result 1910 of FIG. 19. Executing the abstract rule of Table III on the query result 1910 of FIG. 19 is described in above. Method 2700 then exits at step 2770.

If, however, the particular data value is not a valid value, processing continues at step 2780. By way of example, assume that in the given example the most recent value which can be retrieved with respect to the "Endothlin_1" condition field is "Up". Accordingly, the particular data value "Down" is an invalid value.

At step 2780, a predefined action is performed that is configured to prevent execution of the selected analysis routine on an input that is defined by the invalid value "Down". By way of example, the predefined action includes (i) disabling execution of the selected analysis routine on the invalid value; (ii) issuing a notification indicating that the particular data value is invalid, and (iii) replacing the particular data value with a valid data value that satisfies the predefined validating condition, as explained in more detail below with reference to FIG. 28. Method 2700 then exits at step 2770.

Figure 28:
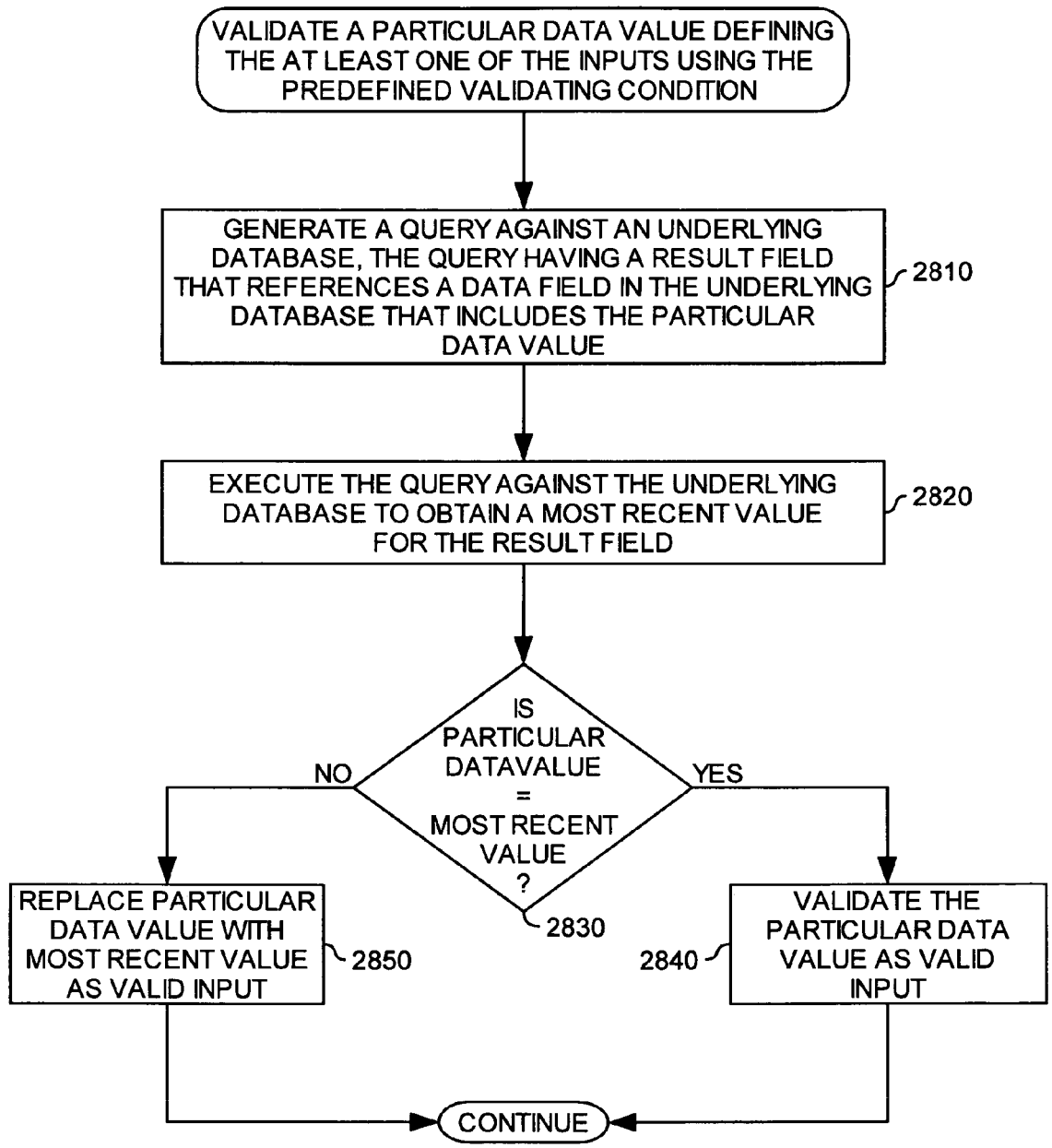
FIG. 28 is a flow chart illustrating a method of validating inputs to an analysis routine.

Referring now to FIG. 28, an exemplary method 2800 of validating the particular data value using the predefined validating condition according to step 2740 of the method 2700 of FIG. 27 is illustrated. By way of example, method 2700 is explained with reference to the given example, in which the predefined validating condition is configured to validate the particular data value "down" as input to the selected analysis routine with respect to the "Endothlin_1" condition field only if the value is a most recent value.

Method 2800 starts at step 2810, where a query (e.g., abstract query 260 of FIG. 2) against an underlying database (e.g., database 230 of FIG. 2) is generated. In one embodiment, the generated query includes a specific result field that corresponds to the condition field that is referenced by the predefined validating condition. The query is configured to retrieve a most recent value for the specific result field. Accordingly, in the given example the query is configured to retrieve a most recent value with respect to an "Endothlin_1" result field. In one embodiment, timeline type metadata such as described in commonly owned U.S. patent application Ser. No. 11/035,710, filed Jan. 14, 2005 entitled, "TIMELINE CONDITION SUPPORT FOR AN ABSTRACT DATABASE", which is also incorporated herein by reference in its entirety, can be used to retrieve the most recent value for the specific result field.

At step 2820, the generated query is executed against the underlying database to retrieve the most recent value. Assume now, that in the given example the value "up" is retrieved as the most recent value for the "Endothlin_1" result field, as described above.

At step 2830, the retrieved most recent value is compared to the particular data value in order to determine whether the particular data value is the most recent one. If the particular data value is the most recent value, the particular data value is validated at step 2840 and processing continues at step 2750 of the method 2700 of FIG. 27. If, however, the particular data value is not the most recent value, processing continues at step 2850.

At step 2850, the particular data value is replaced with the most recent value and validated. However, other operations can be performed instead of or together with replacing the particular data value with the most recent value. For instance, the user can be prompted to indicate whether the particular data value should be replaced. Furthermore, the user can be notified that the particular data value is not valid without replacing the particular data value. All such implementations are broadly contemplated. Processing then continues at step 2750 of the method 2700 of FIG. 27.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing execution of an analysis routine on input data, comprising:
   receiving input;
   receiving user-selection of an analysis routine for processing the received input; wherein the analysis routine is defined by at least one abstract rule set having one or more abstract rules each having a conditional statement and a consequential statement; wherein the consequential statement defines a particular recommendation that is returned when the conditional statement is satisfied;

wherein the conditional statement and the consequential statement are defined using logical field definitions defined in an abstraction model that models underlying physical data, wherein the logical field definitions each specify at least a logical field name and an access method mapping the logical field name to corresponding underlying physical data; and executing the analysis routine on the received input, comprising:

identifying all required inputs for each abstract rule of the analysis routine;

determining whether the received input includes data for all required inputs; and if the received input does not include data for one or more of the required inputs, retrieving suitable data for the one or more of the required inputs from a database.

2. The method of claim 1, wherein receiving input comprises executing a query against the database to obtain a query result, the query result comprising the received input.

3. The method of claim 1, wherein retrieving the suitable data from the database comprises:

generating a query with result fields corresponding to the one or more of the required inputs; and executing the generated query against the database to obtain the suitable data.

4. The method of claim 3, wherein the executed generated query returns a plurality of data values for at least one of the result fields; and further comprising:

selecting one of the plurality of data values as input to a respective abstract rule for which the generated query was executed.

5. The method of claim 4, wherein selecting the one of the plurality of data values comprises:

prompting a user having selected the analysis routine to indicate the selected one of the plurality of data values; and receiving user input indicating the selected one of the plurality of data values.

6. The method of claim 4, wherein selecting the one of the plurality of data values comprises:

identifying a point in time of current execution of the analysis routine; and identifying, as the selected one of the plurality of data values, a data value that was obtained at a point in time being the closest point in time before the identified point in time.

7. The method of claim 1, wherein executing the analysis routine on the received input further comprises:

if the received input includes data for all required inputs, returning the particular recommendation as an analysis result for the analysis routine only if the conditional statement is resolved to true for all required inputs.

8. The method of claim 1, wherein executing the analysis routine on the received input further comprises:

identifying data values for all required inputs from the received input and the retrieved suitable data; and running the analysis routine on the identified data values.

9. The method of claim 8, wherein running the analysis routine on the identified data values comprises:

transforming each abstract rule of the at least one rule set which defines the analysis routine into a transformed rule; and executing, by the rules engine, each transformed rule on the identified data values.

10. The method of claim 9, wherein executing each transformed rule comprises:

if the conditional statement of a given executed transformed rule is resolved to true, returning the particular recommendation defined by the consequential statement of the given executed transformed rule as analysis result.

11. The method of claim 1, wherein all required inputs of the analysis routine describe aspects of a medical condition of a patient of a medical institution; and the analysis routine is configured to provide a recommendation for treatment of the patient.

* * * * *